(12) United States Patent
Jiang

(10) Patent No.: US 12,732,408 B2
(45) Date of Patent: Sep. 8, 2026

(54) SIGNAL TRANSMISSION WITH IMPROVED COUNTER INTERMODULATION PERFORMANCE

(71) Applicant: Spreadtrum Communications USA Inc., San Jose, CA (US)

(72) Inventor: Hong Jiang, Kernersville, NC (US)

(73) Assignee: Spreadtrum Communications USA Inc., San Jose, CA (US)

( * ) Notice: Subject to any disclaimer, the term of this patent is extended or adjusted under 35 U.S.C. 154(b) by 0 days.

(21) Appl. No.: 18/510,161

(22) Filed: Nov. 15, 2023

(65) Prior Publication Data

US 2025/0158871 A1 May 15, 2025

(51) Int. Cl.
*H04L 27/36* (2006.01)
*H04B 1/04* (2006.01)

(52) U.S. Cl.
CPC ......... *H04L 27/364* (2013.01); *H04B 1/0475* (2013.01)

(58) Field of Classification Search
CPC ...... H04B 1/0475; H04B 1/0483; H04B 1/04; H04B 2001/0408; H04L 27/364
See application file for complete search history.

(56) References Cited

U.S. PATENT DOCUMENTS 10,348,528 B2 * 7/2019 Mittal .................. H04B 1/0475
10,454,509 B2 * 10/2019 Asuri .................. H04B 1/0475
11,387,785 B2 * 7/2022 Zheng .................. H04B 1/0475
2022/0190848 A1 * 6/2022 Jiang .................... H04B 1/0475

* cited by examiner

*Primary Examiner* — Betsy Deppe
(74) *Attorney, Agent, or Firm* — Fish & Richardson P.C.

(57) ABSTRACT

An electronic circuit is provided. The electronic circuit includes an input port configured to receive an in-phase (I) data signal and a quadrature (Q) data signal. The electronic circuit includes a conversion circuit configured to convert the I data signal and the Q data signal to a plurality of differential signal pairs. The electronic circuit includes a mixer circuit configured to mix the plurality of differential signal pairs with a plurality of pulse signals to obtain a pair of differential mixer output signals. The electronic circuit includes a variable gain amplifier (VGA) configured to generate an output signal based on the pair of differential mixer output signals. The plurality of pulse signals have a same duty ratio that is greater than $$\frac{100}{N}\%,$$

where N is a total number of the plurality of pulse signals. A phase difference between two consecutive pulse signals equals $$\frac{360}{N}°.$$

Also provided is a method.

20 Claims, 16 Drawing Sheets

300
I INPUT
301
DAC
303
LPF
305
Ip
307-1
In
307-2
310
MIXER
Ip
LO_0
331
321
41.67%
Qp
LO_90
332
322
41.67%
In
LO_180
333
323
41.67%
Qn
LO_270
334
324
41.67%
Vout_p
341
p
n
VGA
340
PA
360
RF FRONT END
370
TO FIG. 3A-2

400
I INPUT
401
Q INPUT
402
403
4-PHASE TO 3-PHASE CONVERSION
-1/2
√3/2
-√3/2
DAC
404
DAC
405
DAC
406
LPF
407
LPF
408
LPF
409
447-1
bb0
bb180
447-2
448-1
bb120
bb300
448-2
449-1
bb240
bb60
449-2
410
MIXER
411
412
413
414
415
416
26.67%
431
432
433
434
435
436
bb0
LO_0
bb60
LO_60
bb120
LO_120
bb180
LO_180
bb240
LO_240
bb300
LO_300
Vout_p
443
p
n
VGA
450
PA
460
RF FRONT END
470
TO FIG. 4A-2

FROM FIG. 4A-1
410
Vout_n
444
417
418
419
420
421
422
26.67%
26.67%
26.67%
26.67%
26.67%
26.67%
437
438
439
440
441
442
bb180
LO_0
bb240
LO_60
bb300
LO_120
bb0
LO_180
bb60
LO_240
bb120
LO_300
490 LO_0
491 LO_60
492 LO_120
493 LO_180
494 LO_240
495 LO_300

SIGNAL TRANSMISSION WITH IMPROVED COUNTER INTERMODULATION PERFORMANCE

BACKGROUND

In wireless communication devices, a transmitter receives digital signals, converts the digital signals to analog signals, modulates the converted analog signals, and provides the modulated signals to the radio frequency (RF) front end for transmission.

SUMMARY

The subject matter disclosed herein relates to techniques for improving counter intermodulation (CIM) performance in wireless transmission.

In general, in some aspects, the subject matter of the present disclosure can be embodied in an electronic circuit. The electronic circuit includes an input port configured to receive an in-phase (I) data signal and a quadrature (Q) data signal. The electronic circuit includes a conversion circuit configured to convert the I data signal and the Q data signal to a plurality of differential signal pairs. The electronic circuit includes a mixer circuit configured to mix the plurality of differential signal pairs with a plurality of pulse signals to obtain a pair of differential mixer output signals. The electronic circuit includes a variable gain amplifier (VGA) configured to generate an output signal based on the pair of differential mixer output signals. The plurality of pulse signals have a same duty ratio that is greater than $$\frac{100}{N}\%,$$

where N is a total number of the plurality of pulse signals. A phase difference between two consecutive pulse signals equals $$\frac{360}{N}°.$$

In some implementations, N=4. The plurality of differential signal pairs includes a positive I signal, a negative I signal, a positive Q signal, and a negative Q signal, and the pair of differential mixer output signals include a positive mixer output signal and a negative mixer output signal. The mixer circuit includes a positive path configured to generate the positive mixer output signal and a negative path configured to generate the negative mixer output signal. The positive path is configured to mix a first pulse signal of the plurality of pulse signals, a second pulse signal of the plurality of pulse signals, a third pulse signal of the plurality of pulse signals, and a fourth pulse signal of the plurality of pulse signals with the positive I signal, the positive Q signal, the negative I signal, and the negative Q signal, respectively. The negative path is configured to mix the first pulse signal, the second pulse signal, the third pulse signal, and the fourth pulse signal with the negative I signal, the negative Q signal, the positive I signal, and the positive Q signal, respectively. The same duty ratio can equal 41.67%. The same duty ratio can be within a range from 41.67%, and the range is determined based on a CIM margin.

In some implementations, N=6. The plurality of differential signal pairs includes a first differential signal pair, a second differential signal pair that has a phase difference of 120° from the first differential signal pair, and a third differential signal pair that has a phase difference of 120° from the second differential signal pair. The pair of differential mixer output signals include a positive mixer output signal and a negative mixer output signal. The mixer circuit includes a positive path configured to generate the positive mixer output signal and a negative path configured to generate the negative mixer output signal. The positive path is configured to mix (a) a first pulse signal of the plurality of pulse signals, (b) a second pulse signal of the plurality of pulse signals, (c) a third pulse signal of the plurality of pulse signals, (d) a fourth pulse signal of the plurality of pulse signals, (e) a fifth pulse signal of the plurality of pulse signals, and (f) a sixth pulse signal of the plurality of pulse signals, with (i) a first signal of the first differential signal pair, (ii) a second signal of the third differential signal pair, (iii) a first signal of the second differential signal pair, (iv) a second signal of the first differential signal pair, (v) a first signal of the third differential signal pair, and (vi) a second signal of the second differential signal pair, respectively. The negative path is configured to mix (a) the first pulse signal of the plurality of pulse signals, (b) the second pulse signal of the plurality of pulse signals, (c) the third pulse signal of the plurality of pulse signals, (d) the fourth pulse signal of the plurality of pulse signals, (e) the fifth pulse signal of the plurality of pulse signals, and (f) the sixth pulse signal of the plurality of pulse signals, with (iv) the second signal of the first differential signal pair, (v) the first signal of the third differential signal pair, (vi) the second signal of the second differential signal pair, (i) the first signal of the first differential signal pair, (ii) the second signal of the third differential signal pair, and (iii) the first signal of the second differential signal pair, respectively. The same duty ratio can equal 26.67%. The same duty ratio can be within a range from 26.67%, and the range is determined based on a CIM margin.

In some implementations, the conversion circuit includes a digital-to-analog converter (DAC) and a low pass filter (LPF) for each of the plurality of differential signal pairs.

In some implementations, the mixer circuit includes a plurality of duty ratio adjustment circuits configured to adjust the same duty ratio by adjusting a threshold voltage.

In some implementations, the electronic circuit includes a frequency synthesizer circuit that generates the plurality of pulse signals.

In some implementations, the electronic circuit includes a power amplifier (PA) configured to amplify the output signal to obtain an amplified signal, and a radio frequency (RF) front end (RFFE) circuit configured to convert the amplified signal to a RF signal.

In some implementations, in general, in some aspects, the subject matter of the present disclosure can be embodied in a method that includes one or more operations of the electronic circuit as described above.

The details of one or more implementations are set forth in the accompanying drawings and the description below. Other features, objects, and advantages of these systems and methods will be apparent from the description and drawings, and from the claims.

BRIEF DESCRIPTION OF THE DRAWINGS

FIGS. 3A-1 and 3A-2 together illustrate a circuit diagram of a 4-phase transmitter, according to some implementations.

FIGS. 4A-1 and 4A-2 together illustrate a circuit diagram of a 6-phase transmitter, according to some implementations.

FIG. 6B illustrates waveforms of three clock signal components obtained from decomposing the waveform illustrated in FIG. 6A.

Figures are not drawn to scale. Like reference numbers refer to like components.

DETAILED DESCRIPTION

Figure 1:
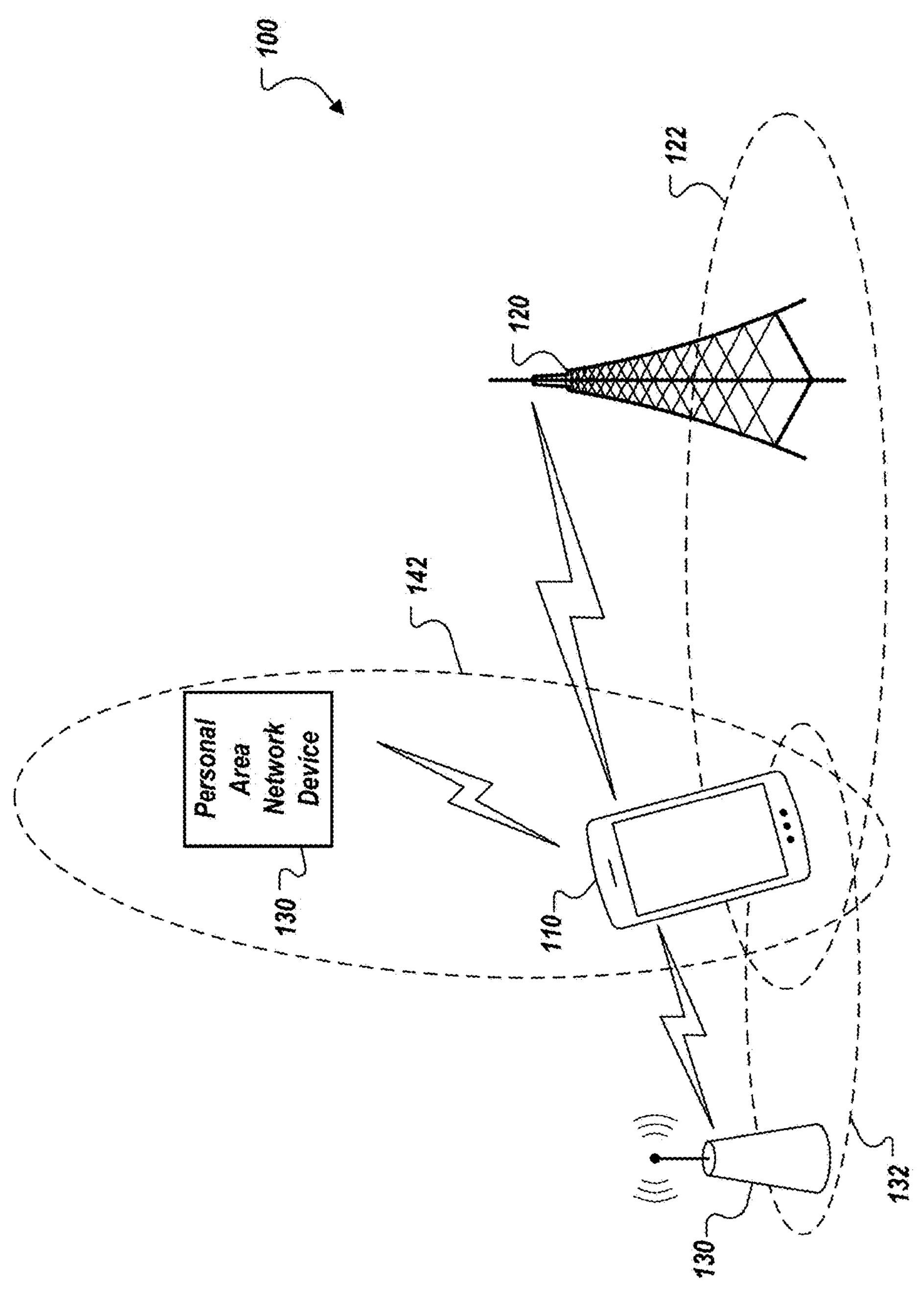
FIG. 1 is a schematic diagram of an example of a wireless communication system, according to some implementations.

The performance of a wireless transmitter can be evaluated using many metrics. For quadrature transmitters that are commonly used in cellular communications, CIM is an important metric that, if not addressed, can lead to waveform distortion and/or violation of emission constraints. CIM can be caused by the square waves of clock signals generated by local oscillators (LOs) and used by mixers in frequency upconversion. For example, the harmonics of the square waves, accompanied by post-mixer non-linearity from components, such PA and VGA, can lead to CIM.

CIM can be measured at different orders. Oftentimes, the third order CIM (CIM3) and the fifth order CIM (CIM5) are of particular interest in wireless transmitter design. CIM3 can be caused by third-order non-linear mixing of a fundamental signal (i.e. a baseband signal modulated onto a carrier frequency) with a third order harmonic. CIM5 can be caused by fifth-order non-linear mixing of a fundamental signal and a third order or a fifth order harmonic. For example, Equation 1 illustrates the generation of CIM3 due to third-order non-linearity when third LO harmonic exists, Equation 2 illustrates the generation of image distortion due to third-order non-linearity when third LO harmonic exists, Equation 3 illustrates the generation of CIM5 due to fifth order non-linearity when third LO harmonic exists, Equation 4 illustrates the generation of CIM5 due to fifth-order non-linearity when fifth LO harmonic exists, and Equation 5 illustrates the generation of CIM3 due to fifth-order non-linearity when fifth LO harmonic exists. In these equations, fro represents the frequency of the clock signals generated by an LO, and $f_{bb}$ represents the frequency of the baseband signal.

$$(3\times f_{LO}-f_{bb})-2\times(f_{LO}+f_{bb})=f_{LO}-3f_{bb} \quad \text{(Equation 1)}$$

$$(3\times f_{LO}+f_{bb})-2\times(f_{LO}+f_{bb})=f_{LO}-f_{bb} \quad \text{(Equation 2)}$$

$$-(3\times f_{LO}+f_{bb})+4\times(f_{LO}+f_{bb})=f_{LO}+5f_{bb} \quad \text{(Equation 3)}$$

$$(5\times f_{LO}-f_{bb})-4\times(f_{LO}+f_{bb})=f_{LO}-5f_{bb} \quad \text{(Equation 4)}$$

$$(5\times f_{LO}+f_{bb})-4\times(f_{LO}+f_{bb})=f_{LO}-3f_{bb} \quad \text{(Equation 5)}$$

While CIM can be reduced by using PAs or VGAs with high linearity, this approach can be very power-consuming and require large dies. Another approach of reducing CIM is using a multi-phase transmitter that can cancel some of the harmonics and thereby reduce CIM. For example, a 4-phase transmitter, which mixes four phase-shifted input signals with four phase-shifted and non-overlapping LO clock signals having a duty ratio of (¼=25%) or less, ideally can cancel up to CIM2 but is unable to cancel CIM3. Similarly, a 6-phase transmitter, which mixes six phase-shifted input signals with six phase-shifted and non-overlapping LO clock signals having a duty ratio of (⅙=16.67%) or less, ideally can cancel up to CIM4 but is unable to cancel CIM5. In general, increasing the number of phases N can improve the performance of CIM reduction. However, to provide the LO clock signals for an N-phase transmitter, the transmitter needs a voltage-controlled oscillator (VCO) operating at a frequency of $N/2\times f_{LO}$, which would be challenging when N becomes large.

This disclosure provides techniques in view of the above challenges. As described below, implementations of this disclosure use overlapping-instead of non-overlapping-LO clock signals to mix with phase-shifted input signals. Implementations of this disclosure also provide the LO clock signal duty ratios that can effectively suppress CIM without increasing the number of phases. With one or more features described below, implementations of this disclosure can advantageously improve transmission performance in wireless communications without significantly increasing circuit complexity or power consumption.

FIG. 1 is a schematic diagram of an example wireless communication system 100 including a wireless device 110 capable of communicating with one or more wireless communication networks. The one or more wireless communication networks with which the wireless device 110 is capable of communicating can include but is not limited to one or more cellular or wireless wide area networks (WWANs), one or more wireless local area networks (WLANs), one or more wireless personal area networks (WPANs), or a combination thereof.

In the example of FIG. 1, the wireless device 110 is communicating with at least one WWAN by way of at least one base station 120 and at least one WLAN by way of at least one access point 130. The at least one base station 120 can support bi-directional communication with wireless devices that are within its corresponding area of coverage 122. Similarly, the at least one access point 130 can support bi-directional communication with wireless devices that are within its corresponding area of coverage 132.

In some implementations, the at least one WWAN with which the at least one base station 120 is associated can be a fifth generation (5G) network among other generations and types of networks. In these implementations, the at least one base station 120 can be a 5G base station that employs orthogonal frequency-division multiplexing (OFDM) and/or non-OFDM and a transmission time interval (TTI) shorter than 1 ms (e.g. 100 or 200 microseconds), to communicate with wireless devices, such as wireless device 110. For example, the at least one base station 120 can take the form of one of several devices, such as a base transceiver station (BTS), a Node-B (NodeB), an evolved NodeB (eNB), a next (fifth) generation (NR) NodeB (gNB), a Home NodeB, a Home eNodeB, a site controller, an access point, a wireless router, a server, router, switch, or other processing entity with a wired or wireless network.

System 100 can use multiple channel access functionality, including for example schemes in which the at least one base station 120 and the wireless device 110 are configured to implement the Long Term Evolution wireless communication standard (LTE), LTE Advanced (LTE-A), and/or LTE Multimedia Broadcast Multicast Service (MBMS). In other implementations, the at least one base station 120 and wireless device 110 are configured to implement UMTS, HSPA, or HSPA+ standards and protocols. Of course, other multiple access schemes and wireless protocols can be utilized. In some examples, one or more such access schemes and wireless protocols can correspond to standards that impose RF power amplifier linearity requirements.

In addition, and as shown in FIG. 1, the wireless device 110 is configured to communicate with one or more personal area network (PAN) devices/systems 130 (e.g., Bluetooth® or radio frequency identification (RFID) systems and devices) over one or more WPANs. The one or more PAN devices/systems 130 can support either one-way or bi-directional communication with wireless devices that are within its corresponding area of coverage 142.

To communicate with one or both of the at least one base station 120 and the access point 130, the wireless device 110 can include singular or multiple transmitter and receiver components similar or equivalent to one or more of those described in further detail below with reference to FIG. 2 to support multiple communications with different types of access points, base stations, and other wireless communication devices.

Although FIG. 1 illustrates one example of a communication system, various changes can be made to FIG. 1. For example, the communication system 100 could include any number of wireless devices, base stations, access points, networks, or other components in any suitable configuration.

Figure 2:
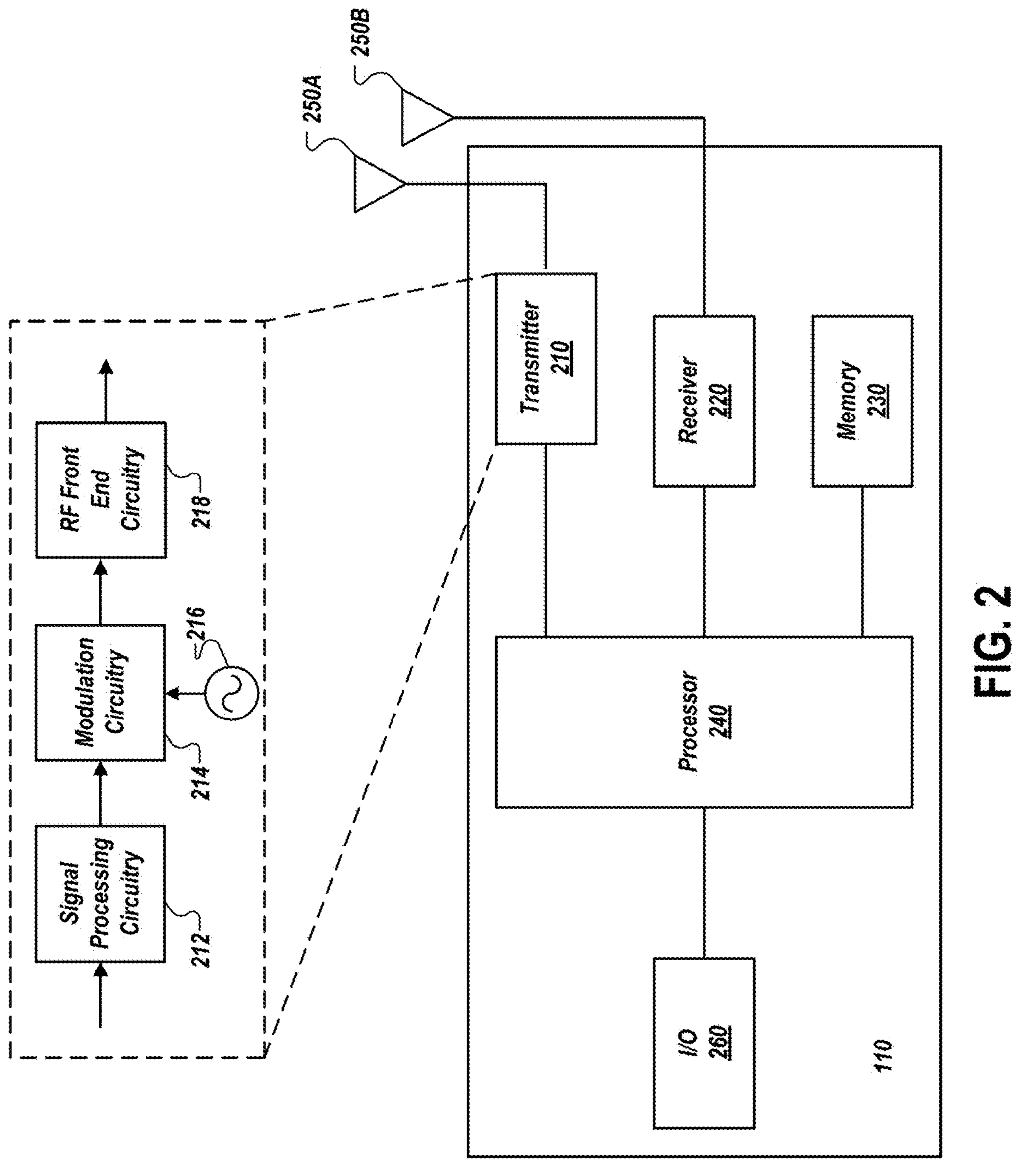
FIG. 2 is a block diagram of example details of a wireless device, according to some implementations.

FIG. 2 is a block diagram that illustrates example details of the wireless device 110 that can implement the subject matter according to this disclosure. The wireless device 110 can, for example, be a mobile telephone, but can be other devices in further examples such as a desktop computer, laptop computer, tablet, hand-held computing device, automobile computing device and/or other computing devices. As shown in the figure, the wireless device 110 is shown as including at least one transmitter 210, at least one receiver 220, memory 230, at least one processor 240, and at least one input/output device 260. Here, only one transmitter and only one receiver are shown, but in many implementations, multiple transmitters and receivers are included to support multiple communications of different types at the same time. Each transmitter may employ the innovations of the present disclosure.

The processor 240 can implement various processing operations of the wireless device 110. For example, the processor 240 can perform signal generation, signal coding, signal analysis, data processing, power control, input/output processing, or any other functionality enabling the wireless device 110 to operate in a communication system, such as system 100 (FIG. 1). The processor 240 can include any suitable processing or computing device configured to perform one or more operations. For example, the processor 240 can include a microprocessor, microcontroller, digital signal processor, field programmable gate array, or application specific integrated circuit, or a combination of these devices.

The transmitter 210 can be configured to modulate data or other content, filter and amplify outgoing RF signals for transmission by at least one antenna 250A. In some implementations, the transmitter 210 can also be configured to amplify, filter and upconvert baseband or intermediate frequency (IF) signals to RFs signals before such signals are provided to the antenna 250A for transmission. The transmitter 210 can include any suitable structure for generating RF signals for wireless transmission. Additional aspects of the transmitter 210 are described in further detail below with reference to components 212-218 as depicted in FIG. 2.

The receiver 220 can be configured to demodulate data or other content received in incoming RF signals by at least one antenna 250B. In some implementations, the receiver 220 can also be configured to amplify, filter and frequency down convert RF signals received via the antenna 250B either to IF or baseband frequency signals prior to conversion to digital form and processing. The receiver 220 can include any suitable structure for processing signals received wirelessly.

Each of the antennas 250A and 250B can include any suitable structure for transmitting and/or receiving wireless RF signals. In some implementations, the antennas 250A and 250B can be implemented by way of a single antenna that can be used for both transmitting and receiving RF signals.

One or multiple transmitters 210, one or multiple receivers 220, and one or multiple antennas 250 could be used in the wireless device 110. For example, in one implementation, device 110 includes at least three transmitters 210 and at least three receivers 220 for communicating via at least a personal area network such as Bluetooth®, a Wi-Fi network such as an IEEE 802.11 based network, and a cellular network. Each transmitter 210 may employ the concepts of the present disclosure. Although shown as separate blocks or components, at least one transmitter 210 and at least one receiver 220 could be combined into a transceiver. Each transceiver may employ the concepts of the present disclosure. Accordingly, rather than showing a separate block for the transmitter 210 and a separate block for the receiver 220 in FIG. 2, a single block for a transceiver could have been shown.

The wireless device 110 further includes one or more input/output devices 260. The input/output devices 260 facilitate interaction with a user. Each input/output device 260 includes any suitable structure for providing information to or receiving information from a user, such as a speaker, microphone, keypad, keyboard, display, and/or touch screen.

In addition, the wireless device 110 includes at least one memory 230. The memory 230 stores instructions and data used, generated, and/or collected by the wireless device 110. For example, the memory 230 could store software or firmware instructions executed by the processor(s) 240 and data used to reduce or eliminate interference in incoming signals. Each memory 230 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

In some implementations, the transmitter 210 can include signal processing circuitry 212, modulation circuitry 214, and RF front end circuitry 218. The signal processing circuitry 212 may include one or more circuits that are configured to process signals received as input (e.g. from processor 240). For example, the signal processing circuitry 212 may include a digital-to-analog converter (D/A), which converts a digital input (e.g. a digital signal from processor 240) into an analog signal, which is then provided to a low pass filter, which filters the analog signal and provides the filtered analog signal to the modulation circuitry 214. The modulation circuitry 214, in addition to receiving the filtered analog signal from the signal processing circuitry 212, can, in some implementations, also receive a signal from a local oscillator 216 for modulating or adjusting the frequency of the analog signal, e.g., from a first frequency to a second frequency that is higher than the first frequency. For instance, the modulation circuitry 214 can include a mixer that frequency up-converts the filtered analog signal from a relatively low frequency (e.g. baseband frequency, or an IF that is offset from the baseband frequency) to a relatively high frequency RF signal. Thus, a signal from the local oscillator 216 is used as a carrier signal in transmitter 210. Moreover, as shown in FIG. 2, transmitter 210 includes RF front end circuitry 218, which can include, e.g., amplification and filtering circuits that amplify and filter, respectively, the RF signal. The RF front end circuitry can also include a power amplifier that is configured to provide sufficient amplification of the signal to meet transmission requirements, as may be specified by wireless communication standards. Examples of such standards include those set forth by the 3rd Generation Partnership Project (3GPP), which is a group that develops standards for cellular telecommunications technologies, including radio access, core network, and service capabilities.

The RF signal amplified by the power amplifier may be filtered again by at least one additional filter downstream of the power amplifier before being provided as an output of the transmitter 210 to the at least one antenna 250A for wireless transmission. Such filter or filters can alternatively be provided upstream from the power amplifier in which case the output of the power amplifier is provided to the at least one antenna 250A for wireless transmission.

Figures 1, 3A:
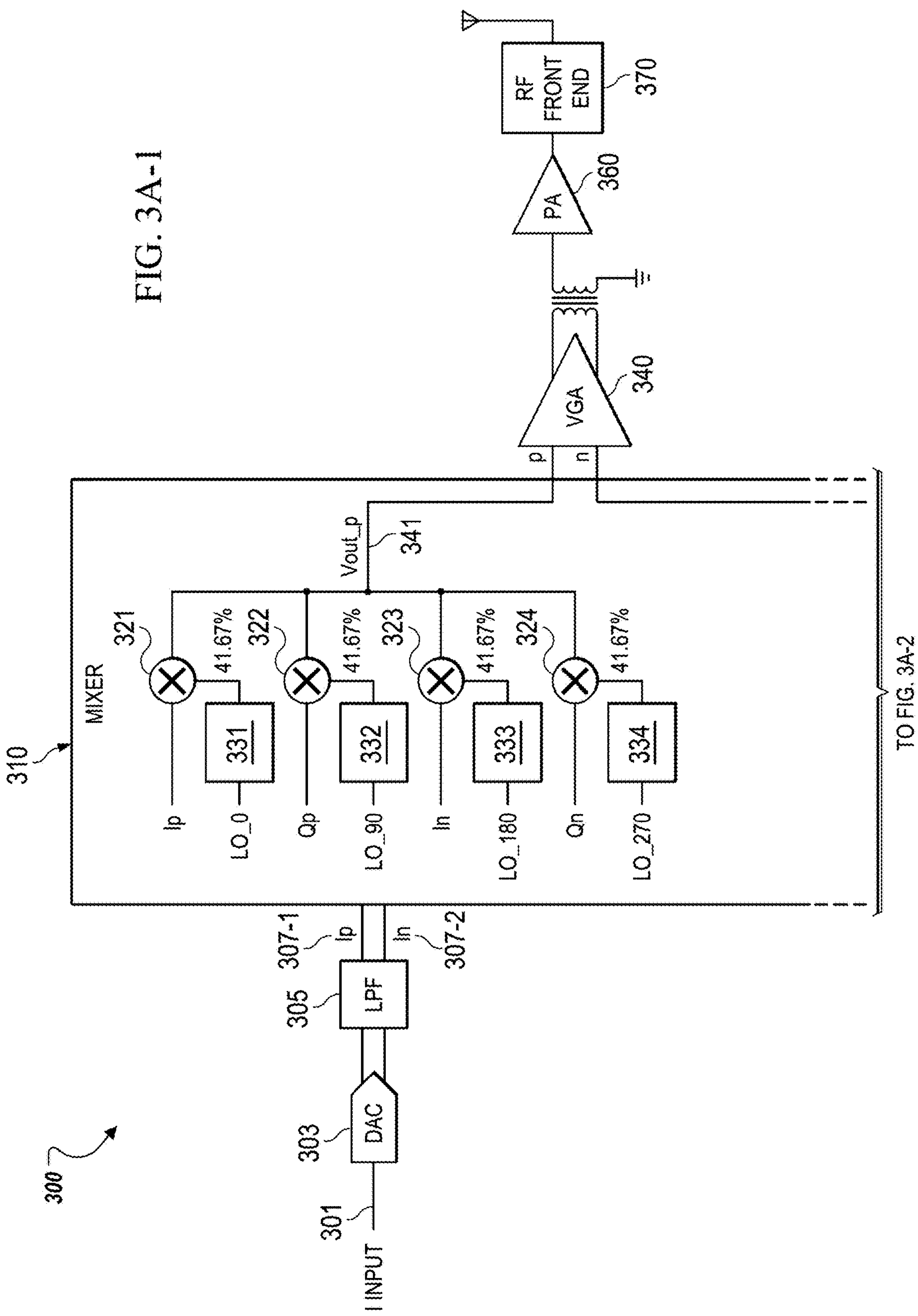
Figures 2, 3A:
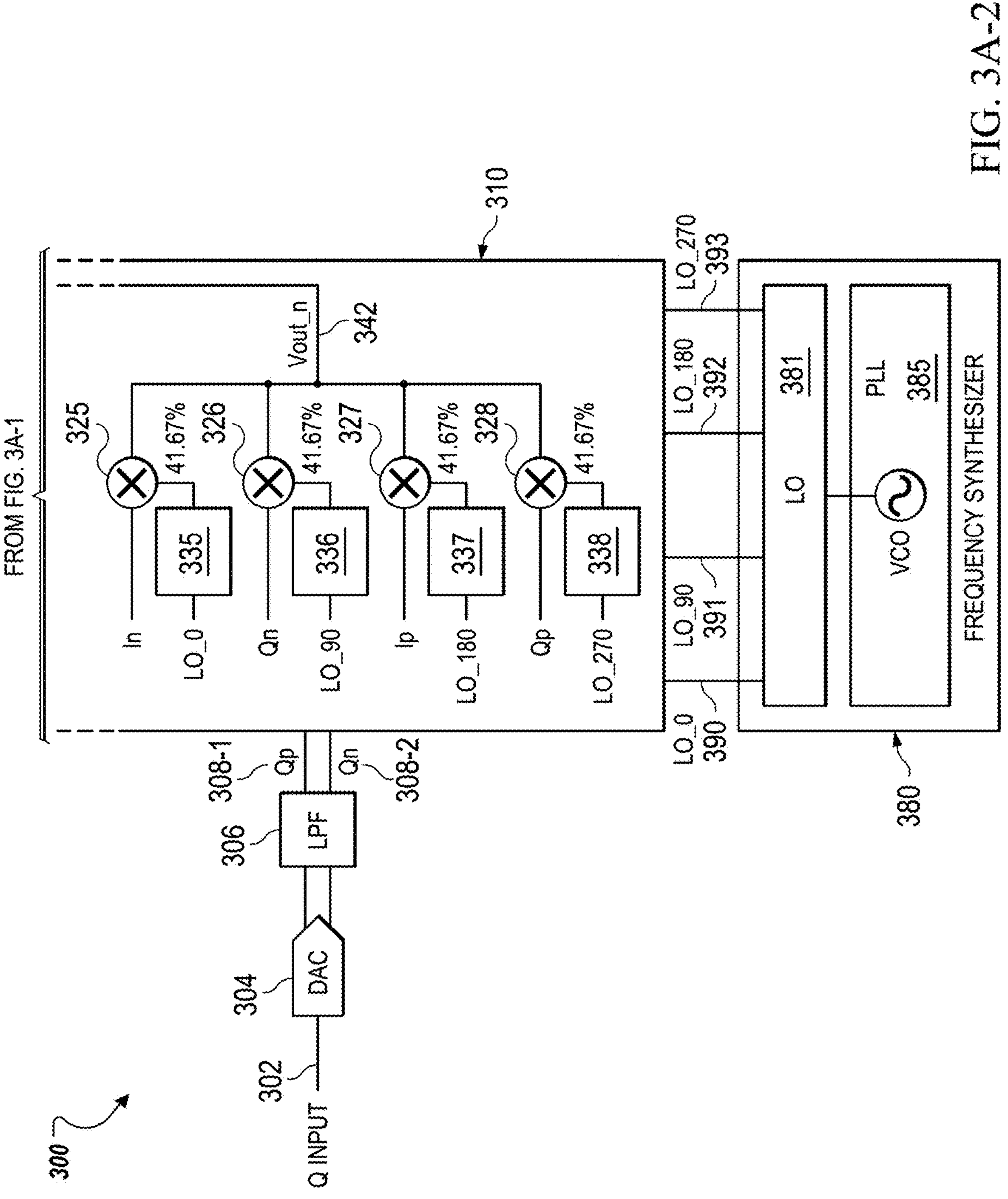

FIGS. 3A-1 and 3A-2, collectively referred to as FIG. 3A, together illustrate a circuit diagram of a 4-phase transmitter 300, according to some implementations. The transmitter 300 can be similar to the transmitter 210 of FIG. 2.

As illustrated in FIG. 3A, the transmitter 300 has an input port, which can be a quadrature input port including an I input 301 and a Q input 302 that receive an I data signal and a Q data signal, respectively. The I data signal and the Q data signal are each converted by a DAC, 303 and 304, respectively, and filtered by an LPF, 305 and 306, respectively, which together can be part of the signal processing circuitry 212 of FIG. 2. The output of the LPF 305 becomes a differential signal pair, which has a positive I signal (Ip) 307-1 and a negative I signal (In) 307-2, collectively referred to as differential signal pair 307. Similarly, the output of the LPF 306 becomes a differential signal pair, which has a positive Q signal (Qp) 308-1 and a negative Q signal (Qn) 308-2, collectively referred to as differential signal pair 308. Signals of differential signal pairs 307 and 308 constitute four phases of input signals to a mixer 310. For example, Ip 307-1 and In 307-2 can be 180° different in phase, and Qp 308-1 and Qn 308-2 can be 180° different in phase. Additionally, Ip 307-1 and Qp 308-1 can be 90° different in phase, and In 307-2 and Qn 308-2 can be 90° different in phase.

The mixer 310 is configured to mix the four phases of input signals (i.e., the differential signal pairs 307 and 308) with four LO clock signals 390-393 (also labeled as LO_0, LO_90, LO_180, and LO_270). The LO clock signals 390-393, which can be square wave pulse signals, have the same waveform but are 90° phase-shifted from one another. For example, LO_90 can have a 90° phase difference from LO_0, LO_180 can have a 90° phase difference from LO_90, and LO_270 can have a 90° phase difference from LO_180. More generally, the phase difference between two consecutive LO clock signals for an N-phase (N being an integer greater than 0) can equal $$\frac{360}{N}°.$$

The LO clock signals 390-393 are generated by a frequency synthesizer 380, which can include a phase-locked loop 385 and an LO 381. The phase-locked loop 385 can have a VCO that provides the LO 381 with a clock signal at a given frequency, and the LO 381 can generate the four LO clock signals 390-393 using the clock signal from the VCO as a reference.

The mixer 310 mixes the LO clock signals 390-393 with the differential signal pairs 307 and 308. As illustrated in FIG. 3A-1, the mixer 310 has a positive path with mixer units 321-324, which mix the LO clock signals 390-393 with signals Ip, Qp, In, and Qn, respectively. As illustrated in FIG. 3A-2, the mixer 310 has a negative path with mixer units 325-328, which mix the LO clock signals 390-393 with signals In, Qn, Ip, and Qp, respectively. The positive path outputs a positive mixer output signal 341 by combining the outputs of the mixer units 321-324, and the negative path outputs a negative mixer output signal 342 by combining the outputs of the mixer units 325-328. Signals 341 and 342 together form a pair of differential mixer output signals, which are output by the mixer 310 and respectively input to the positive input and the negative input of a VGA 340. The output of the VGA 340 is then coupled to an input of a PA 360 configured to amplify the VGA output and then provided to the RFFE 370 configured to convert the output of the PA 360 to an RF signal.

Before each of the mixer units 321-328 mixes a LO clock signal with a corresponding one of signals In, Qn, Ip, and Qp, the LO clock signal undergoes duty ratio adjustment. In implementations illustrated in FIG. 3A, the duty ratio adjustment is performed by duty ratio adjustment circuits 331-338 of the mixer 310. In other implementations, the duty ratio adjustment can be performed by circuitry that is separate from the mixer 310.

After duty ratio adjustment, each two consecutive LO clock signals among LO clock signals 390-393 can have time-overlapping pulses. For 4-phase LO clock signals, consecutive LO clock signals can have time-overlapping pulses when the duty ratio of each LO clock signal is greater than 25%. More generally, for N-phase LO clock signals, consecutive LO clock signals can have time-overlapping pulses when the duty ratio of each LO clock signal is greater than 100/N %. In the example of the transmitter 300, the LO clock signals 390-393 each have a duty ratio of about 41.67% after duty ratio adjustment.

Figure 3B:
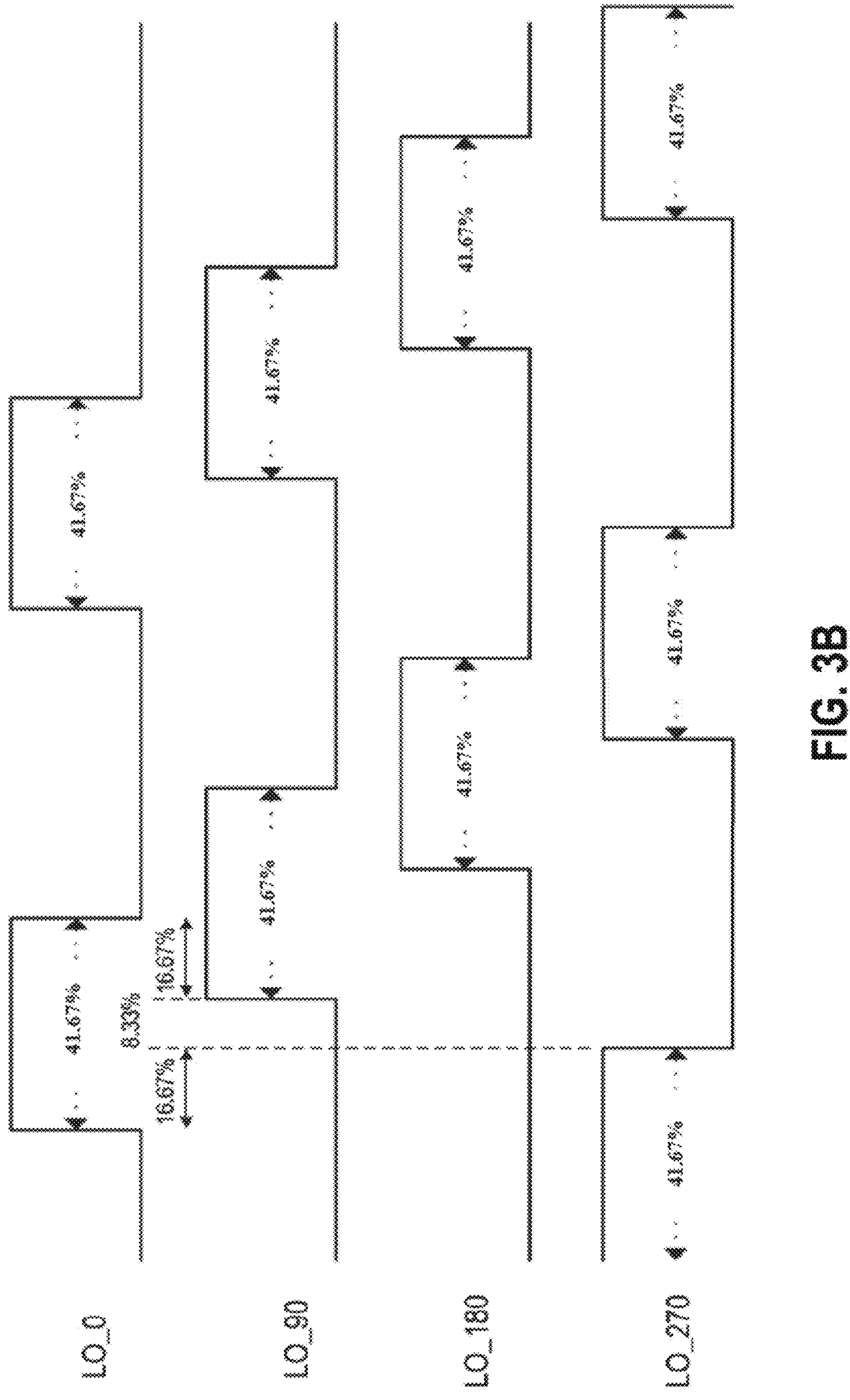
FIG. 3B is a timing diagram of local oscillator (LO) clock signals in a 4-phase transmitter, according to some implementations.

FIG. 3B is a timing diagram of LO clock signals in a 4-phase transmitter, according to some implementations. The LO clock signals, which can be the same as signals 390-393 in FIG. 3A, are 90° phase-shifted from one another and have a duty ratio of about 41.67%.

Using a pulse of LO_0 as an example, it can be seen in FIG. 3B that LO_0 overlaps LO_270 for a duration equaling 16.67% of a clock cycle after the rising edge of the pulse and overlaps LO_90 for the same duration before the falling edge of the pulse. During the middle 8.33% of a clock cycle, LO_0 does not overlap other LO clock signals. The circuit model of overlapping LO clock signals and the equivalent signal waveforms are described later with reference to FIGS. 5-6B.

Figures 1, 4A:
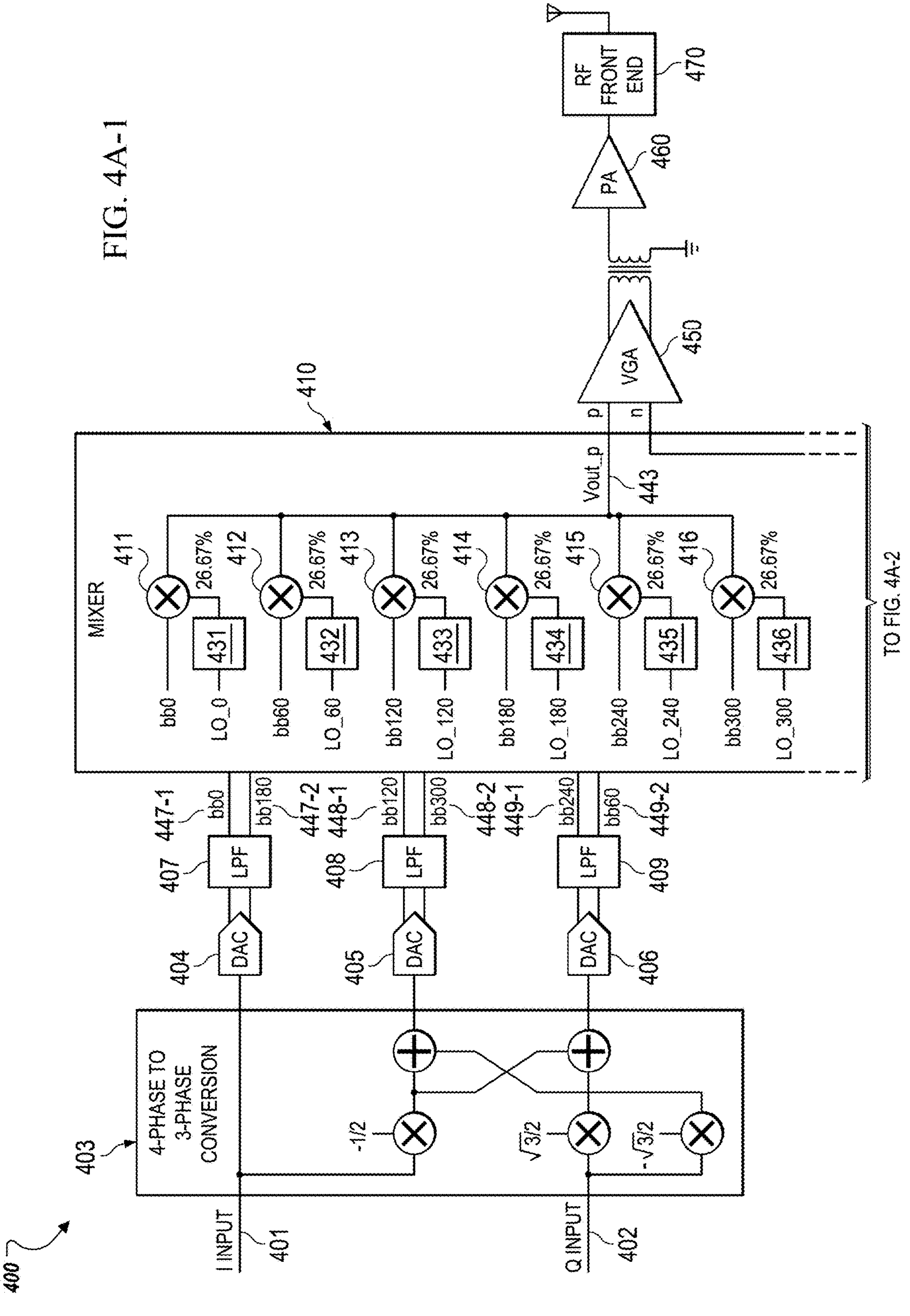
Figures 2, 4A:
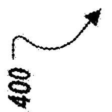

FIGS. 4A-1 and 4A-2, collectively referred to as FIG. 4A, together illustrate a circuit diagram of a 6-phase transmitter 400, according to some implementations. The transmitter 400 can be similar to the transmitter 210 of FIG. 2.

As illustrated in FIG. 4A, the transmitter 400 has an input port, which can be a quadrature input port including an I input 401 and a Q input 402 that receive an I data signal and a Q data signal, respectively. Different from the 4-phase transmitter 300 that provides two differential signal pairs 307 and 308 to the mixer 310, the 6-phase transmitter 400 provides three differential signal pairs to the mixer 410: a first differential signal pair including a first base band signal (bb0) 447-1 and a second base band signal (bb180) 447-2 collectively referred to differential signal pair 447, a second differential signal pair including a first base band signal (bb120) 448-1 and a second base band signal (bb300) 448-2 collectively referred to differential signal pair 448, and a third differential signal pair including a first base band signal (bb240) 447-1 and a second base band signal (bb60) 447-2 collectively referred to differential signal pair 449.

The two signals in each of differential signal pairs 447-449 are 180° different in phase. Further, the three differential signal pairs 447-449 have 120° phase difference from one another. For example, signals 448-1 and 448-2 of differential signal pair 448 are respectively 120° phase-shifted from signals 447-1 and 447-2 of differential signal pair 447, signals 449-1 and 449-2 of differential signal pair 449 are respectively 120° phase-shifted from signals 448-1 and 448-2 of differential signal pair 448, signals 447-1 and 447-2 of differential signal pair 447 are respectively 120° phase-shifted from signals 449-1 and 449-2 of differential signal pair 449. To generate the three differential signal pairs 447-449, the I input 401 and the Q input 402 undergo conversion at circuit 403, which generates three outputs with the same magnitude and 120° phase difference from one another. The three outputs then undergo DACs 404-406 and LPFs 407-409 to become the differential signal pairs 447-449.

The mixer 410 is configured to mix the six phases of input signals (i.e., the differential signal pairs 447-449) with six LO clock signals 490-495 (also labeled as LO_0, LO_60, LO_120, LO_180, LO_240, and LO_300). The LO clock signals 490-495, which can be square wave pulse signals, have the same waveform but are 60° phase-shifted from one another. For example, LO_60 can have a 60° phase difference from LO_0, LO_120 can have a 60° phase difference from LO_60, and so forth. The LO clock signals 490-495 can be generated by a frequency synthesizer, similar to the frequency synthesizer 380 that generates the LO clock signals 390-393.

The mixer 410 mixes the LO clock signals 490-495 with the differential signal pairs 447-449. As illustrated in FIG. 4A-1, the mixer 410 has a positive path with mixer units 411-416, which mix the LO clock signals 490-495 with signals bb0, bb60, bb120, bb180, bb240, and bb300, respectively. As illustrated in FIG. 4A-2, the mixer 410 has a negative path with mixer units 417-422, which mix the LO clock signals 490-495 with signals bb180, bb240, bb300, bb0, bb60, and bb120, respectively. The positive path outputs a positive mixer output signal 443 by combining the outputs of the mixer units 411-416, and the negative path outputs a negative mixer output signal 444 by combining the outputs of the mixer units 417-422. Signals 443 and 444 together form a pair of differential mixer output signals, which are output by the mixer 410 and respectively input to the positive input and the negative input of a VGA 450. The output of the VGA 450 is then coupled to an input of a PA 460 configured to amplify the VGA output and then provided to the RFFE 470 configured to convert the output of the PA 460 to an RF signal.

The LO clock signals 490-495 undergo duty ratio adjustment by duty ratio adjustment circuits 431-442 in a manner similar to that described above with reference to the transmitter 300. In the 6-phase transmitter 400, consecutive LO clock signals can have time-overlapping pulses when the duty ratio of each LO clock signal is greater than 16.67%. In the example of the transmitter 400, the LO clock signals 490-495 each have a duty ratio of about 26.67% after duty ratio adjustment.

Figure 4B:
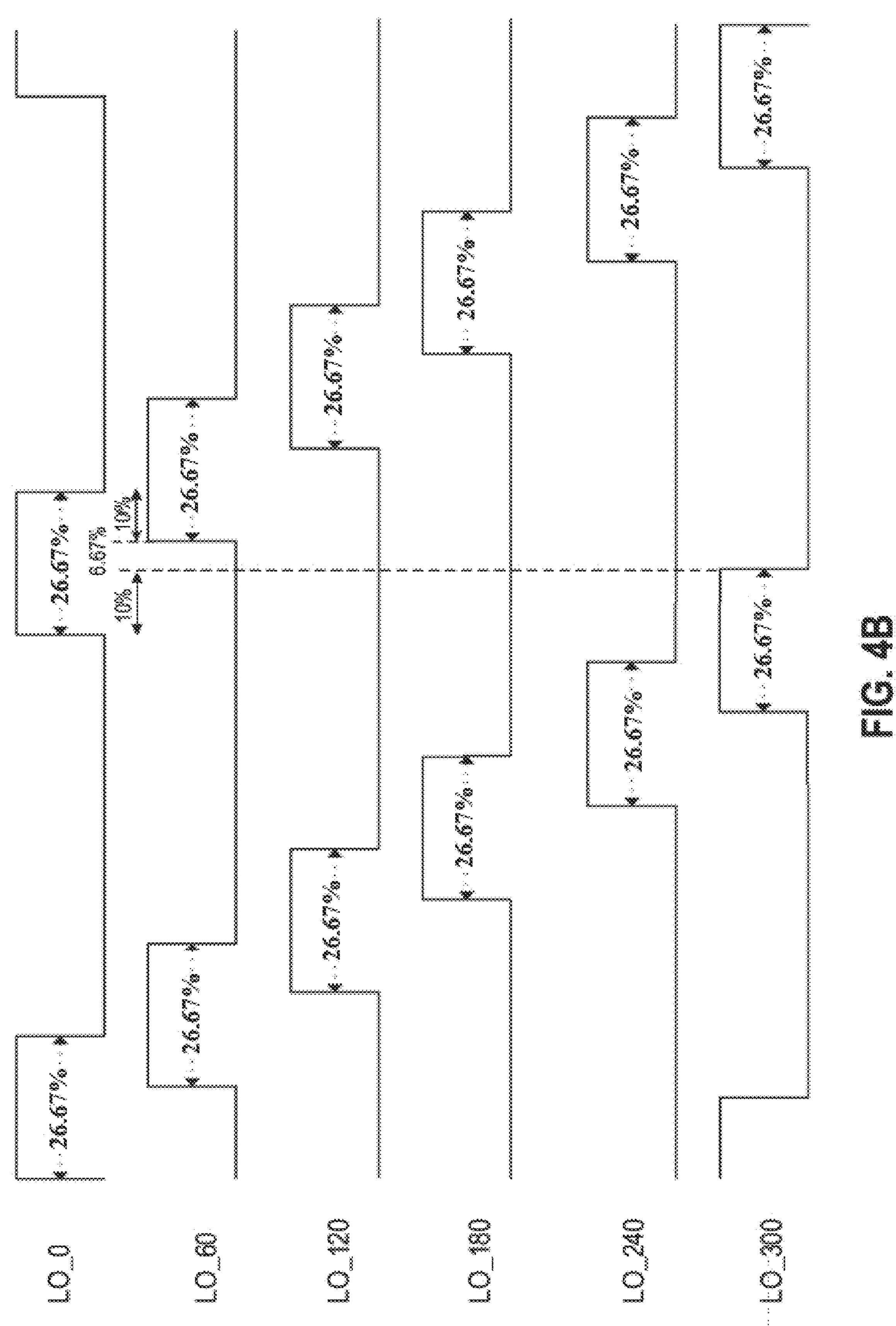
FIG. 4B is a timing diagram of LO clock signals of a 6-phase transmitter, according to some implementations.

FIG. 4B is a timing diagram of LO clock signals of a 6-phase transmitter, according to some implementations. The LO clock signals, which can be the same as signals 490-495 in FIG. 4A, are 60° phase-shifted from one another and have a duty ratio of about 26.67%. As shown, for each LO clock signal, 6.67% of a clock cycle in the middle of a pulse is the overlapping duration, while the rest of the pulse, 10% from the rising edge and 10% before the falling edge, are non-overlapping durations.

Figure 5:
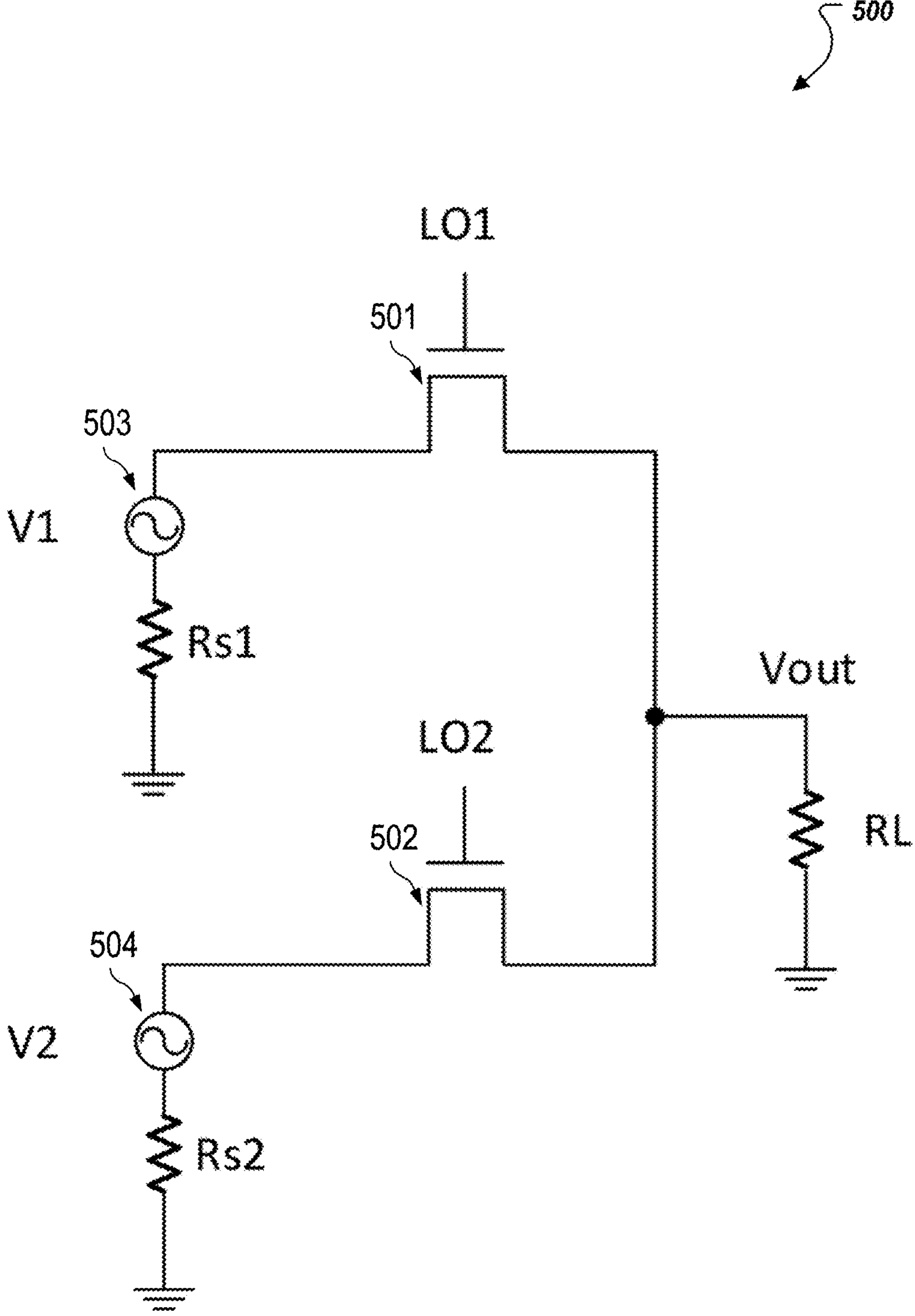
FIG. 5 illustrates a circuit model of two overlapping LO clock signals respectively mixed with two input signals, according to some implementations.

FIG. 5 illustrates a circuit model 500 of two overlapping LO clock signals respectively mixed with two input signals. The two overlapping LO clock signals, LO1 and LO2, can be any two overlapping LO clock signals illustrated in FIG. 3A or any two overlapping LO clock signals illustrated in FIG. 4A. Correspondingly, the two input signals, V1 and V2, which are respectively mixed with LO1 and LO2, can be two of the signals Ip, Qp, In, and Qn, or can be two of the signals 447-1, 447-2, 448-1, 448-2, 449-1, and 449-2. For example, the circuit model 500 can represent the mixing of LO_0 with Ip by the mixer unit 321 and the mixing of LO_90 with Qp by the mixer unit 322. In this example, LO_0 and LO_90 can be modeled by two switches, 501 and 502, controlled by LO1 and LO2, respectively, and Ip and Qp can be modeled by two voltage sources, 503 and 504, whose output voltage are V1 and V2, respectively. Additionally, the combination of the outputs of the mixer units 321 and 322 can be modeled by the output voltage Vout. In the circuit model 500, the internal resistances of the voltage sources 503 and 504 are denoted as Rs1 and Rs2, respectively, and the load resistance at the output is denoted by RL. The circuit model 500 assumes that RL>>Rs1=Rs2.

According to the circuit model 500, when LO1 and LO2 do not overlap, only one of the switches 501 and 502 is on at a time, so the output voltage Vout approximately equals either V1 or V2. When LO1 and LO2 overlap, both of the switches 501 and 502 are on, and each of the voltage sources 503 and 504 contributes about a half of its output voltage, V1 and V2, respectively, to the output voltage Vout. Accordingly, Vout approximately equals ½× (V1+V2). According to the concept of superposition, for input baseband signal V1, the output voltage is halved to be ½×V1 at the output during the overlapping time and the output maintains at V1 during the non-overlapping time. Other input baseband signals likewise follow similar principles.

Figure 6A:
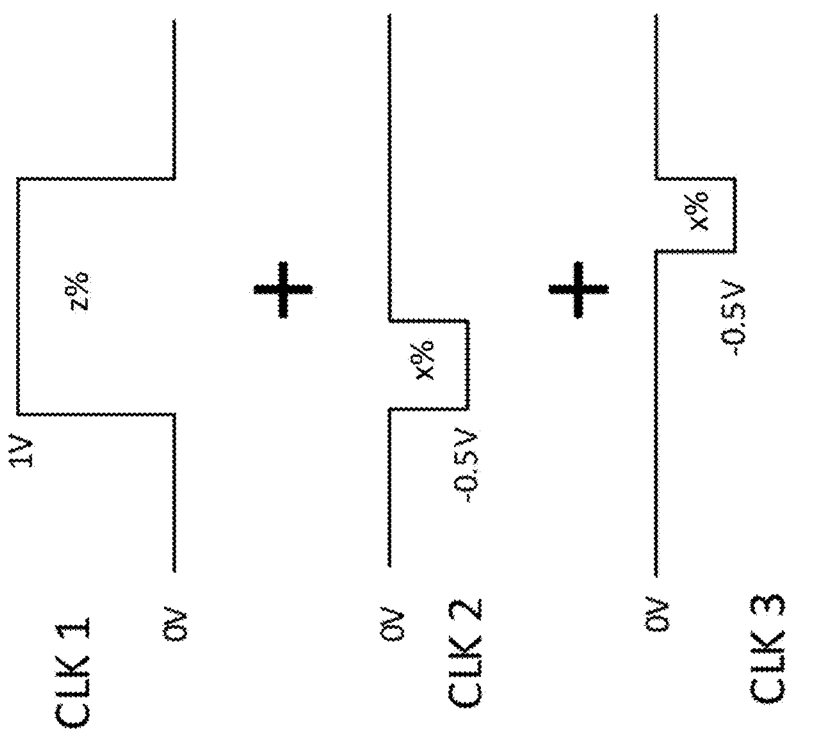
FIG. 6A illustrates a waveform of an equivalent LO clock signal based on the circuit model of FIG. 5.
Figure 6A:
Figure 6A:
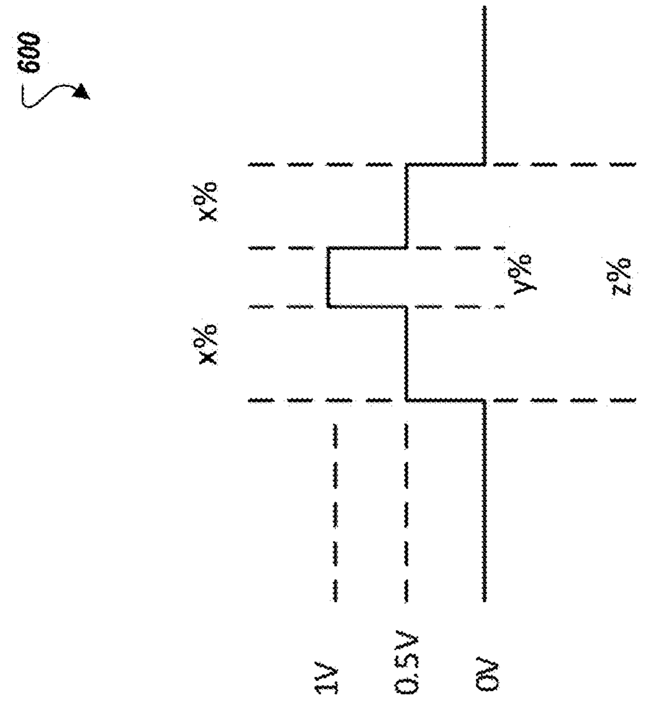

FIG. 6A illustrates a waveform of an equivalent LO clock signal 600 based on the circuit model of FIG. 5, with the assumption that V1=V2=1 Volt. As illustrated, the LO clock signal 600 has a duty ratio of z %. Within the z % duty cycle, x % starting from the rising edge and x % before the falling edge are overlapping durations in which the LO clock signal 600 overlaps another LO clock signal, while the rest y % in the middle is a non-overlapping duration. In the example illustrated in FIG. 3B, z=41.67, z=16.67, and y=8.33. In the example illustrated in FIG. 4B, z=26.67, z=10, and y=6.67. According to the circuit model 500, each of LO1 and LO2 can be equivalently considered to have a waveform the same as the LO clock signal 600.

FIG. 6B illustrates waveforms of three clock signal components obtained from decomposing the waveform illustrated in FIG. 6A. As illustrated in FIGS. 6A and 6B, the LO clock signal 600 can be decomposed to three clock signals CLK1 to CLK3. CLK1 has a magnitude of 1 V and a pulse width equaling to z % of a cycle of the LO clock signal 600. CLK2 and CLK3, which are superimposed on CLK1 due to overlapping LO clock signals, both have a magnitude of −0.5 V and a pulse width equaling to x % of the cycle of the LO clock signal 600.

Figure 7A:
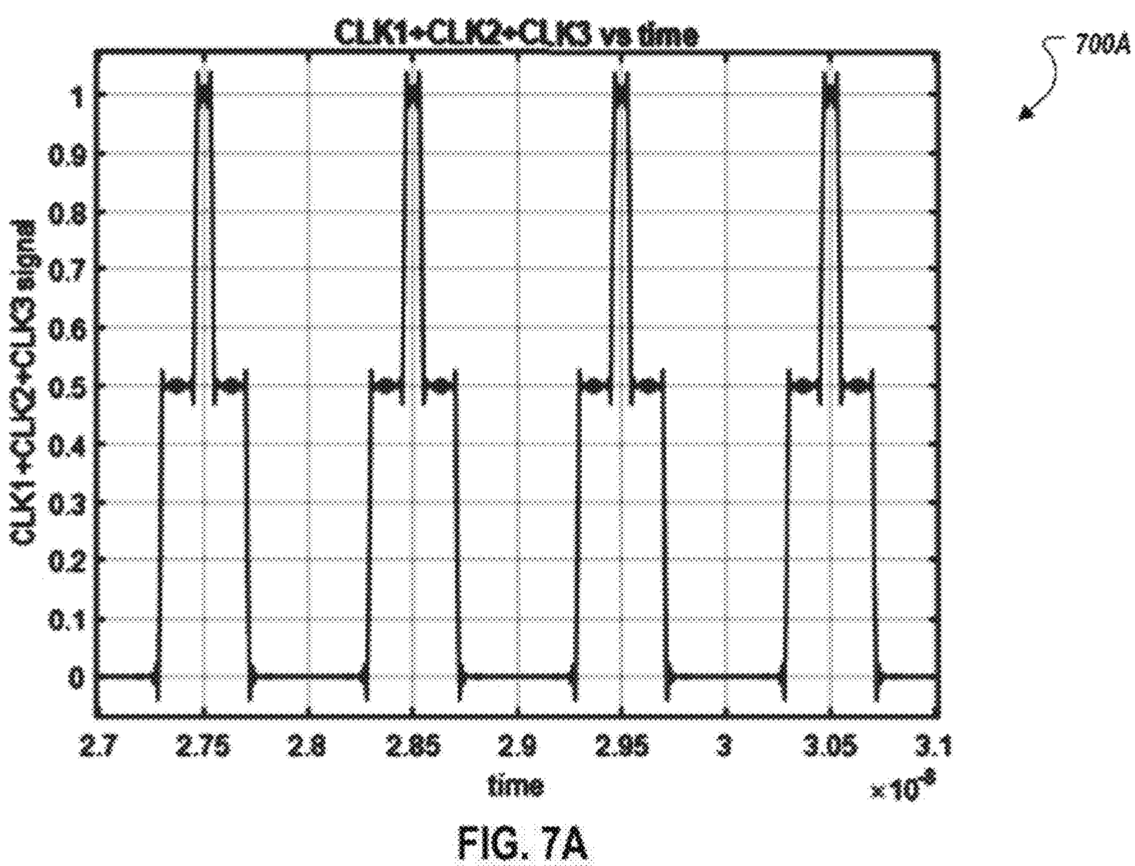
FIG. 7A illustrates a time domain waveform of an equivalent LO clock signal in a 4-phase transmitter, according to some implementations.
Figure 7B:
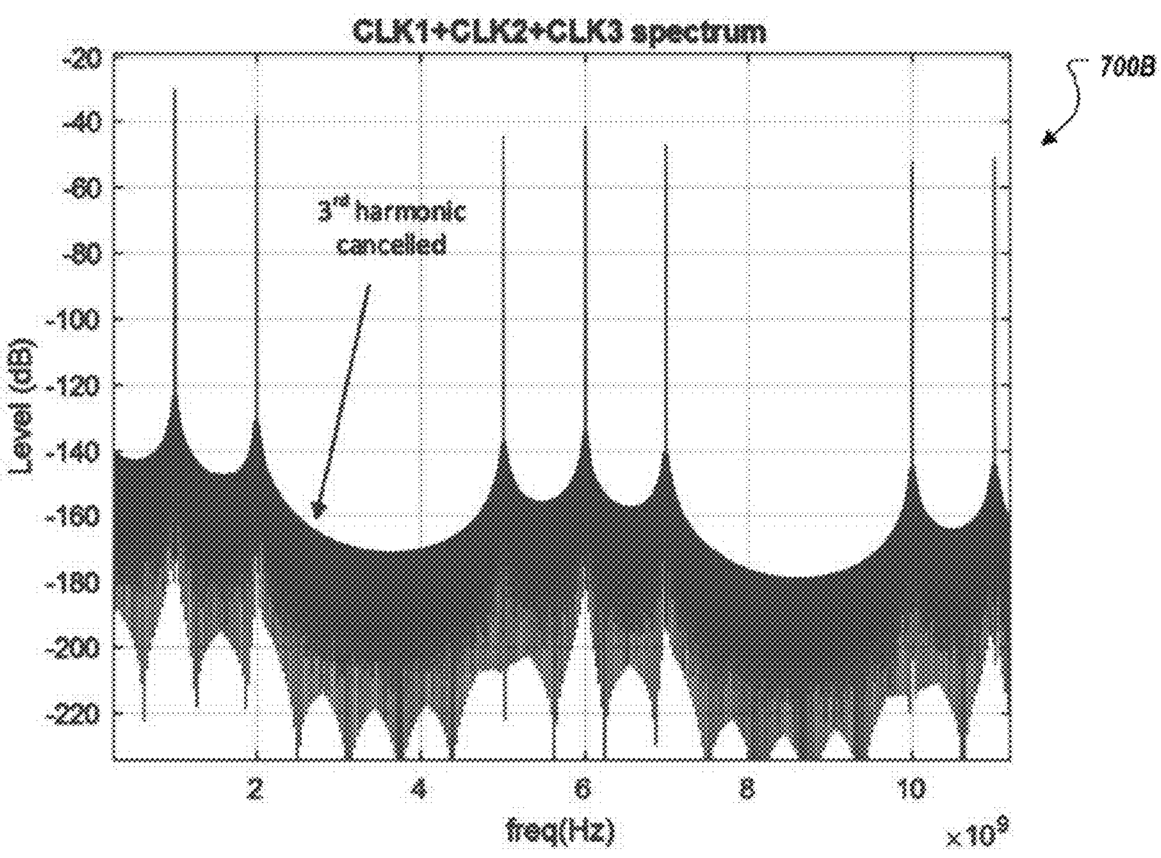
FIG. 7B illustrates a frequency domain waveform that corresponds to the time domain waveform of FIG. 7A.

According to one or more implementations, having overlapping LO clock signals can help reduce CIM, largely because the frequency components of CLK2 and CLK3 can reduce the harmonics that cause the CIM, as illustrated in FIGS. 7A and 7B. By contrast, other techniques usually consider overlapping LO clock signals undesirable. Those techniques either control the duty ratio of the LO clock signals such that the LO clock signals do not overlap, or use isolation circuitry at the output of each mixer unit to prevent superposition of one mixer unit's output on another mixer unit's output.

FIG. 7A illustrates a time domain waveform 700A of an equivalent LO clock signal in a 4-phase transmitter, according to some implementations. As illustrated, the waveform 700A shows a periodic signal with a cycle of $10^{-9}$ second (corresponding to a frequency of 1 GHz). Within each cycle the waveform is similar to that shown in FIG. 6A, with the values of x, y, and z respectively being 16.67, 8.33, and 41.67.

FIG. 7B illustrates a frequency domain waveform 700B that corresponds to the time domain waveform 700A of FIG. 7A. As shown on the waveform 700B, the third harmonic is effectively cancelled. The cancellation or reduction of the third harmonic can lead to cancelled or reduced CIM3.

Figure 7C:
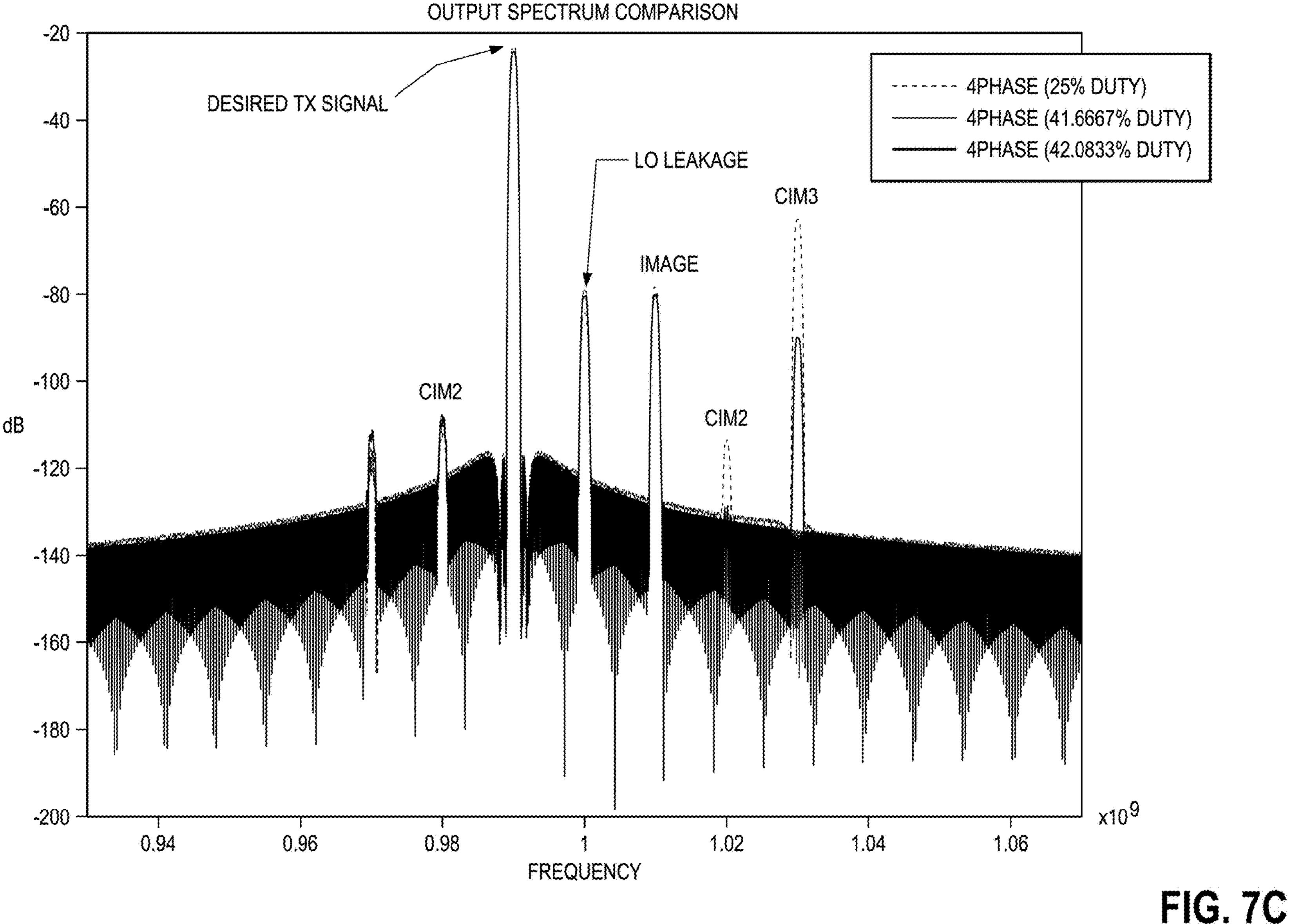
FIG. 7C compares CIM3 performances for different LO clock signal duty ratios in a 4-phase transmitter, according to some implementations.

FIG. 7C compares CIM3 performances for different LO clock signal duty ratios in a 4-phase transmitter, according to some implementations. As shown in FIG. 7C, the frequency of the input signal to the transmitter is about 990 MHZ. The LO clock frequency is about 1 GHZ. CIM3 occurs at about 1.03 GHz. When the LO clock signals have a duty ratio of 25%, CIM3 is about −40 dBc (−65−(−25)=−40), where the number (−25) is the magnitude in dB of the desired TX signal. When the LO clock signals have a duty ratio of 41.67%, CIM3 is not observable from the spectrum and is effectively cancelled. When the LO clock signals have a duty ratio of 42.08%, CIM3 is improved by about 30 dB when comparing to standard 25% duty ratio case. The spectrum shows that CIM3 can be effectively cancelled or significantly reduced when the duty ratio is about 41.67%. As the duty ratio changes from 41.67%, CIM3 performance deteriorates. Accordingly, when a CIM3 margin (e.g., a maximum acceptable CIM3 level) is given, the LO clock duty ratio can be adjusted to be within a range from 41.67%. With the range determined, the 4-phase transmitter can be designed to suppress CIM3 according to the given CIM3 margin.

Figure 8A:
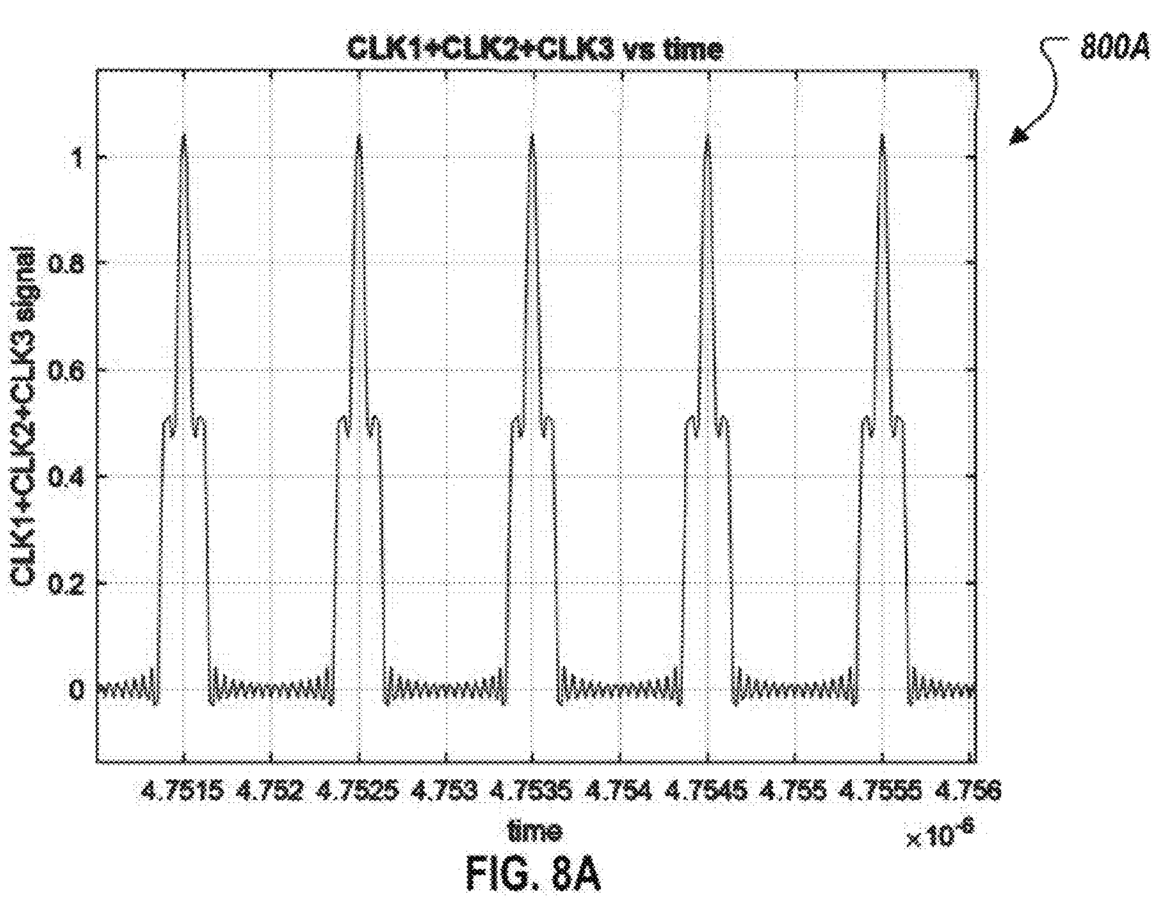
FIG. 8A illustrates a time domain waveform of an equivalent LO clock signal in a 6-phase transmitter, according to some implementations.

FIG. 8A illustrates a time domain waveform 800A of an equivalent LO clock signal in a 6-phase transmitter, according to some implementations. As illustrated, the waveform 800A shows a periodic signal with a cycle of $10^{-9}$ second (corresponding to a frequency of 1 GHz). Within each cycle the waveform is similar to that shown in FIG. 6A, with the values of x, y, and z respectively being 10, 6.67, and 26.67.

Figure 8B:
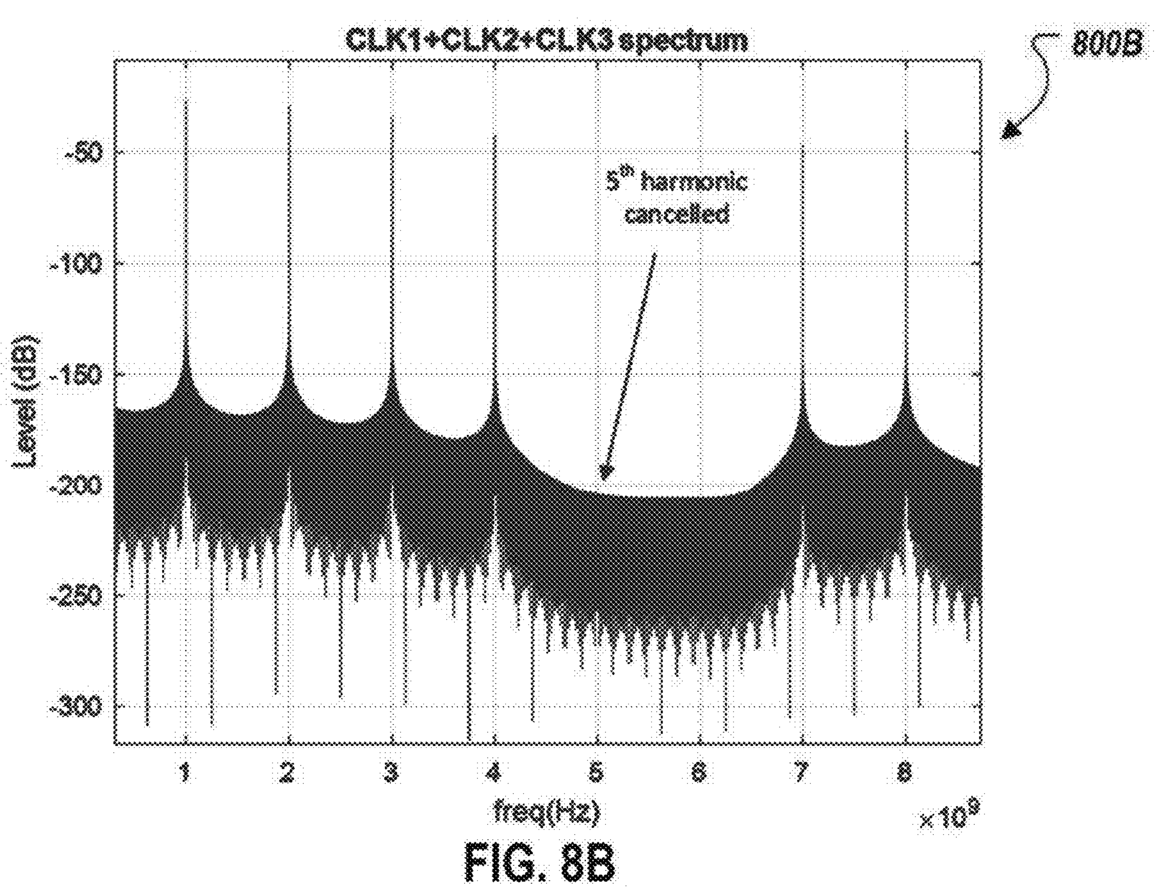
FIG. 8B illustrates a frequency domain waveform that corresponds to the time domain waveform of FIG. 8A.

FIG. 8B illustrates a frequency domain waveform 800B that corresponds to the time domain waveform 800A of FIG. 8A. As shown on the waveform 700B, the fifth harmonic is effectively cancelled. The cancellation or reduction of the third harmonic can lead to cancelled or reduced CIM5.

Figure 8C:
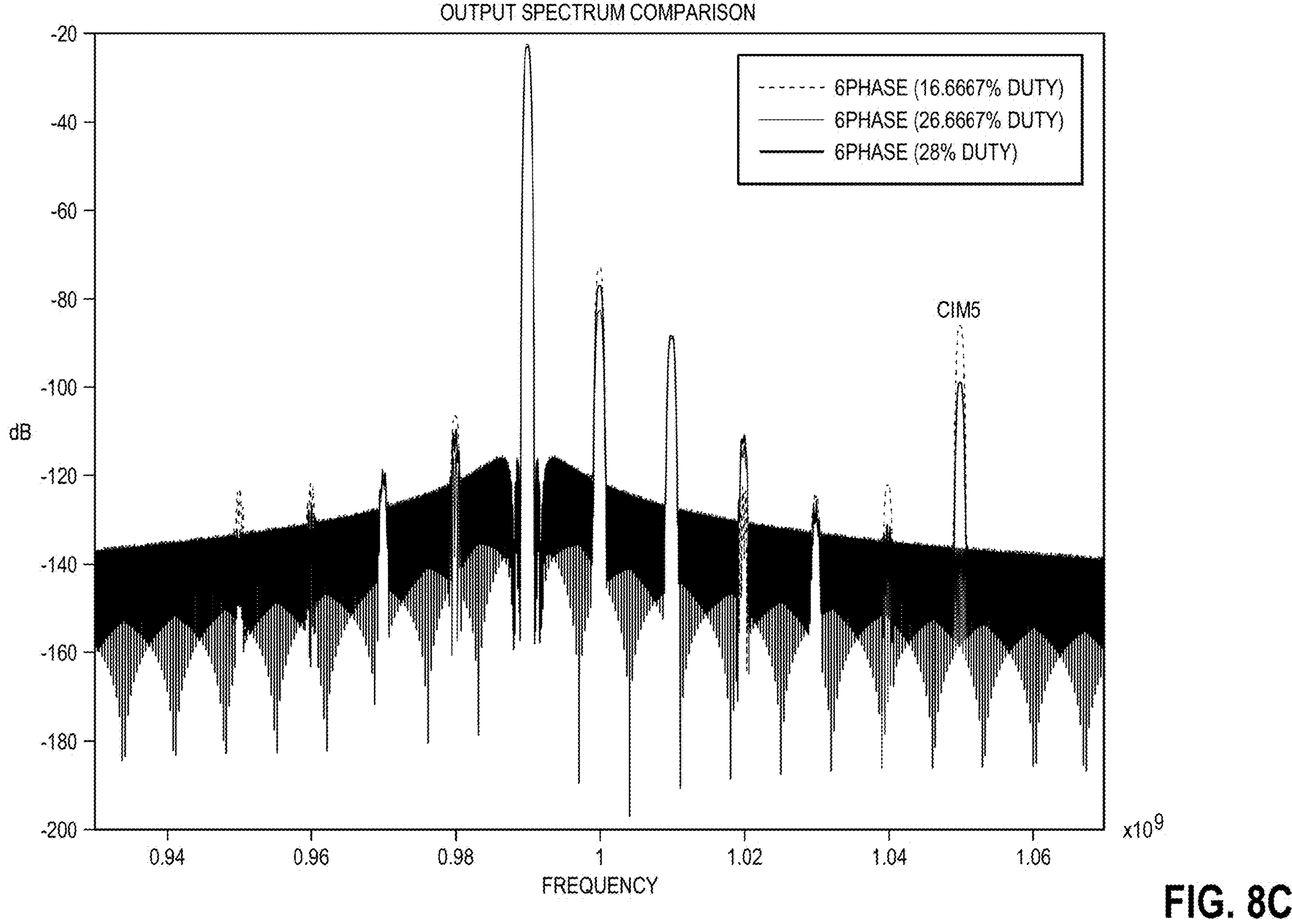
FIG. 8C compares CIM5 performances for different LO clock signal duty ratios in a 6-phase transmitter, according to some implementations.

FIG. 8C compares CIM5 performances for different LO clock signal duty ratios in a 6-phase transmitter, according to some implementations. Similar to the observation from FIG. 7C, CIM5 is about −85−(−25)=−60 dB when the LO clock signals have a duty ratio of 16.67%, and is about −100−(−25)=−75 dB when the LO clock signals have a duty ratio of 28%, which is about 15 dB improvement. When the LO clock signals have a duty ratio of 26.67%, CIM5 is not observable from the spectrum and is effectively cancelled. Accordingly, when a CIM5 margin (e.g., a maximum acceptable CIM5 level) is given, the LO clock duty ratio can be adjusted to be within a range from 26.67%. With the range determined, the 6-phase transmitter can be designed to suppress CIM5 according to the given CIM5 margin.

Figure 9:
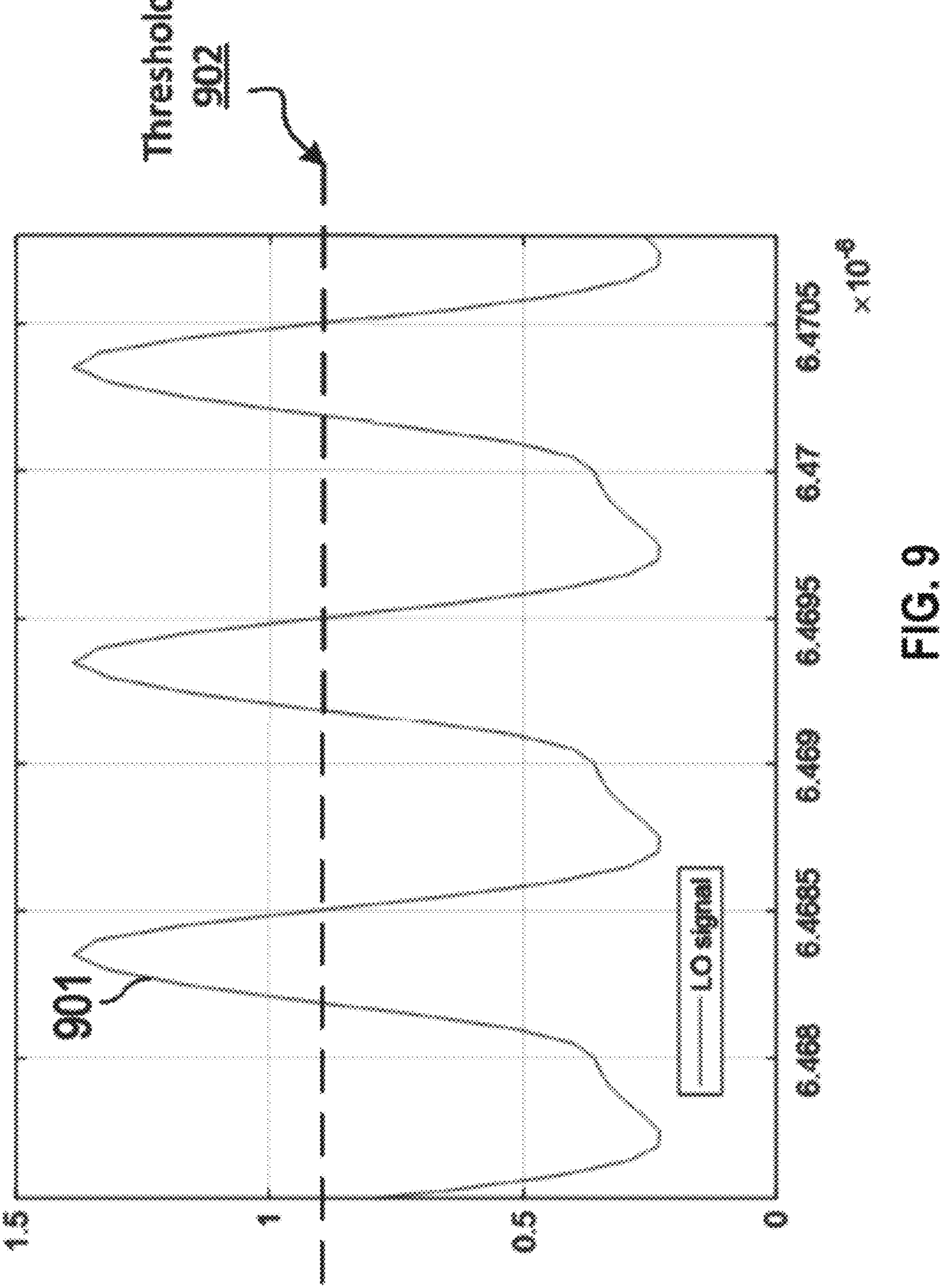
FIG. 9 illustrates adjustment of a duty ratio of an LO clock signal, according to some implementations.

FIG. 9 illustrates adjustment of a duty ratio of an LO clock signal 901, according to some implementations. The LO clock signal 901 can be any of the LO clock signals 390-393 of FIG. 3A or any of the LO clock signals 490-495 of FIG. 4A.

As illustrated in FIG. 9, the duty ratio of the LO clock signal 901 can be adjusted by adjusting a voltage threshold 902. Because different values of the voltage threshold 902 correspond to different pulse widths, moving the voltage threshold 902 higher or lower can make the pulses of the LO clock signal 901 narrower or wider, thereby making the duty ratio lower or higher. The mechanism of adjusting duty ratio in FIG. 9 can be implemented by, e.g., the duty ratio adjustment circuits 331-338 of the mixer 310 or the duty ratio adjustment circuits 431-442 of the mixer 410.

Figure 10:
FIG. 10 is a flowchart of an example method, according to some implementations.
Figure 10:
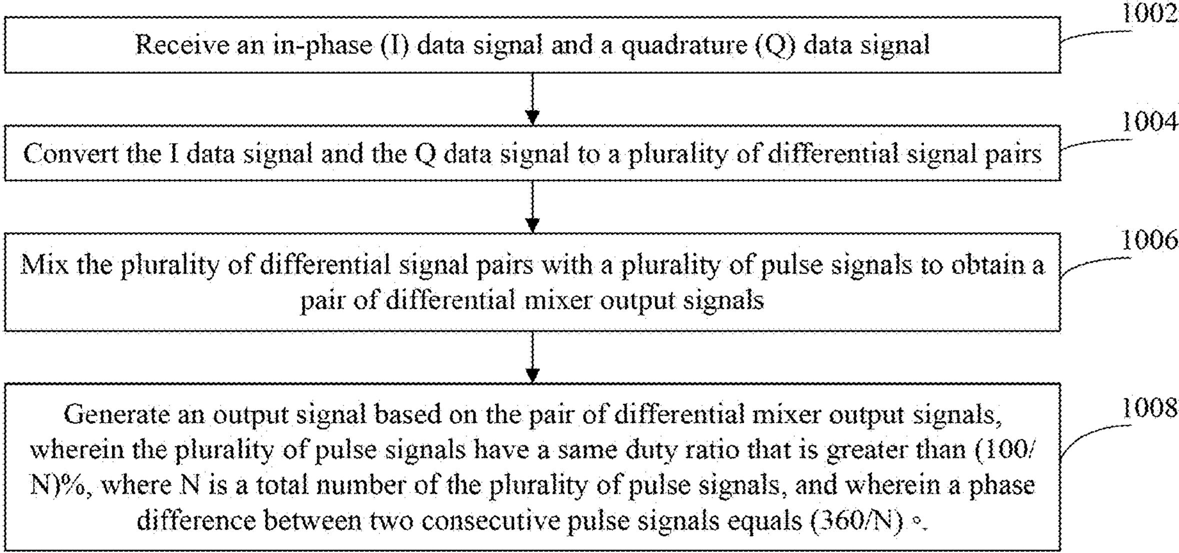

FIG. 10 is a flowchart of an example method 1000, according to some implementations. The method 1000 can be performed by a wireless transmitter, such as the transmitters 300 or 400. The performance of the method 1000 can be in a computer simulation environment, in a laboratory testing environment, in a manufacturing facility, or as part of a real-world wireless communications setting.

At 1002, the method 1000 involves receiving, e.g., using a data input port, an I data signal and a Q data signal.

At 1004, the method 1000 involves converting the I data signal and the Q data signal to a plurality of differential signal pairs, such as the differential signal pairs 307-308 of FIG. 3A or the differential signal pairs 447-449 of FIG. 4A.

At 1006, the method 1000 involves mixing the plurality of differential signal pairs with a plurality of pulse signals to obtain a pair of differential mixer output signals. The mixing can involve, e.g., the mixer 310 of FIG. 3A or the mixer 410 of FIG. 4A.

At 1008, the method 1000 involves generating an output signal based on the pair of differential mixer output signals. The generation of the output signal can involve components such as a VGA, a PA, or an RFFE. Additionally, the plurality of pulse signals have a same duty ratio that is greater than $$\frac{100}{N}\%,$$

and a phase difference between two consecutive pulse signals equals $$\frac{360}{N}°,$$

where N is a total number of the plurality of pulse signals.

While this disclosure contains many specific implementation details, these should not be construed as limitations on the scope of what may be claimed. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially be claimed as such, one or more features from a combination can in some cases be excised from the combination, and the combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system modules and components in the implementations described above should not be understood as requiring such separation in all implementations, and it should be understood that the described program components and systems can generally be integrated together in a single software product or packaged into multiple software products.

In addition, techniques, systems, subsystems, and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results.

What is claimed is:

1. An electronic circuit comprising:

an input port configured to receive an in-phase (I) data signal and a quadrature (Q) data signal;

a conversion circuit configured to convert the I data signal and the Q data signal to a plurality of differential signal pairs;

a mixer circuit configured to mix the plurality of differential signal pairs with a plurality of pulse signals to obtain a pair of differential mixer output signals; and a variable gain amplifier (VGA) configured to generate an output signal based on the pair of differential mixer output signals, wherein the plurality of pulse signals have a same duty ratio that is greater than $$\frac{100}{N}\%,$$

where N is a total number of the plurality of pulse signals, wherein a phase difference between two consecutive pulse signals equals $$\frac{360}{N}°,$$

wherein the mixer circuit comprises one of a four-phase mixer or a six-phase mixer, wherein, when the mixer circuit comprises the four-phase mixer, the mixer circuit is configured to mix the plurality of differential signal pairs with a plurality of pulse signals having the same duty ratio greater than 25%, and wherein, when the mixer circuit comprises the six-phase mixer, the mixer circuit is configured to mix the plurality of differential signal pairs with a plurality of pulse signals having the same duty ratio greater than 16.7%.

2. The electronic circuit of claim 1, wherein, when the mixer circuit comprises the four-phase mixer, the plurality of differential signal pairs comprises a positive I signal, a negative I signal, a positive Q signal, and a negative Q signal, and the pair of differential mixer output signals comprise a positive mixer output signal and a negative mixer output signal, the mixer circuit comprises a positive path configured to generate the positive mixer output signal and a negative path configured to generate the negative mixer output signal, the positive path is configured to mix a first pulse signal of the plurality of pulse signals, a second pulse signal of the plurality of pulse signals, a third pulse signal of the plurality of pulse signals, and a fourth pulse signal of the plurality of pulse signals with the positive I signal, the positive Q signal, the negative I signal, and the negative Q signal, respectively, and the negative path is configured to mix the first pulse signal, the second pulse signal, the third pulse signal, and the fourth pulse signal with the negative I signal, the negative Q signal, the positive I signal, and the positive Q signal, respectively.

3. The electronic circuit of claim 2, wherein the same duty ratio equals 41.67%.

4. The electronic circuit of claim 2, wherein the same duty ratio is about 41.67%.

5. The electronic circuit of claim 1, wherein, when the mixer circuit comprises the six-phase mixer, the plurality of differential signal pairs comprises a first differential signal pair, a second differential signal pair that has a phase difference of 120° from the first differential signal pair, and a third differential signal pair that has a phase difference of 120° from the second differential signal pair, the pair of differential mixer output signals comprise a positive mixer output signal and a negative mixer output signal, the mixer circuit comprises a positive path configured to generate the positive mixer output signal and a negative path configured to generate the negative mixer output signal, the positive path is configured to mix (a) a first pulse signal of the plurality of pulse signals, (b) a second pulse signal of the plurality of pulse signals, (c) a third pulse signal of the plurality of pulse signals, (d) a fourth pulse signal of the plurality of pulse signals, (e) a fifth pulse signal of the plurality of pulse signals, and (f) a sixth pulse signal of the plurality of pulse signals, with (i) a first signal of the first differential signal pair, (ii) a second signal of the third differential signal pair, (iii) a first signal of the second differential signal pair, (iv) a second signal of the first differential signal pair, (v) a first signal of the third differential signal pair, and (vi) a second signal of the second differential signal pair, respectively, and the negative path is configured to mix (a) the first pulse signal of the plurality of pulse signals, (b) the second pulse signal of the plurality of pulse signals, (c) the third pulse signal of the plurality of pulse signals, (d) the fourth pulse signal of the plurality of pulse signals, (e) the fifth pulse signal of the plurality of pulse signals, and (f) the sixth pulse signal of the plurality of pulse signals, with (i) the second signal of the first differential signal pair, (ii) the first signal of the third differential signal pair, (iii) the second signal of the second differential signal pair, (iv) the first signal of the first differential signal pair, (v) the second signal of the third differential signal pair, and (vi) the first signal of the second differential signal pair, respectively.

6. The electronic circuit of claim 5, wherein the same duty ratio equals 26.67%.

7. The electronic circuit of claim 5, wherein the same duty ratio is about 26.67%.

8. The electronic circuit of claim 1, wherein the conversion circuit comprises a digital-to-analog converter (DAC) and a low pass filter (LPF) for each of the plurality of differential signal pairs.

9. The electronic circuit of claim 1, wherein the mixer circuit comprises a plurality of duty ratio adjustment circuits configured to adjust the same duty ratio by adjusting a threshold voltage.

10. The electronic circuit of claim 1, further comprising a frequency synthesizer circuit that generates the plurality of pulse signals.

11. The electronic circuit of claim 1, further comprising:

a power amplifier (PA) configured to amplify the output signal to obtain an amplified signal; and a radio frequency (RF) front end (RFFE) circuit configured to convert the amplified signal to a RF signal.

12. A method comprising:

receiving an in-phase (I) data signal and a quadrature (Q) data signal;

converting the I data signal and the Q data signal to a plurality of differential signal pairs;

mixing the plurality of differential signal pairs with a plurality of pulse signals to obtain a pair of differential mixer output signals; and generating an output signal based on the pair of differential mixer output signals, wherein the plurality of pulse signals have a same duty ratio that is greater than $$\frac{100}{N}\%,$$

where N is a total number of the plurality of pulse signals, wherein a phase difference between two consecutive pulse signals equals $$\frac{360}{N}°,$$

wherein, based on the plurality of pulse signals comprising four pulse signals, Nis 4 and the four pulse signals have the same duty ratio greater than 25%, and wherein, based on the plurality of pulse signals comprising six pulse signals, N is 6 and the six pulse signals have the same duty ratio greater than 16.7%.

13. The method of claim 12, wherein N=4, wherein the plurality of differential signal pairs comprises a positive I signal, a negative I signal, a positive Q signal, and a negative Q signal, and the pair of differential mixer output signals comprise a positive mixer output signal and a negative mixer output signal, and wherein mixing the plurality of differential signal pairs with a plurality of pulse signals comprises:

mixing the a first pulse signal of the plurality of pulse signals, a second pulse signal of the plurality of pulse signals, a third pulse signal of the plurality of pulse signals, and a fourth pulse signal of the plurality of pulse signals with the positive I signal, the positive Q signal, the negative I signal, and the negative Q signal, respectively, and mixing the first pulse signal, the second pulse signal, the third pulse signal, and the fourth pulse signal with the negative I signal, the negative Q signal, the positive I signal, and the positive Q signal, respectively.

14. The method of claim 13, wherein the same duty ratio equals 41.67%.

15. The method of claim 13, wherein the same duty ratio is about 41.67%.

16. The method of claim 12, wherein N=6, wherein the plurality of differential signal pairs comprises a first differential signal pair, a second differential signal pair that has a phase difference of 120° from the first differential signal pair, and a third differential signal pair that has a phase difference of 120° from the second differential signal pair, wherein the pair of differential mixer output signals comprise a positive mixer output signal and a negative mixer output signal, wherein mixing the plurality of differential signal pairs with a plurality of pulse signals comprises:

mixing (a) a first pulse signal of the plurality of pulse signals, (b) a second pulse signal of the plurality of pulse signals, (c) a third pulse signal of the plurality of pulse signals, (d) a fourth pulse signal of the plurality of pulse signals, (e) a fifth pulse signal of the plurality of pulse signals, and (f) a sixth pulse signal of the plurality of pulse signals, with (i) a first signal of the first differential signal pair, (ii) a second signal of the third differential signal pair, (iii) a first signal of the second differential signal pair, (iv) a second signal of the first differential signal pair, (v) a first signal of the third differential signal pair, and (vi) a second signal of the second differential signal pair, respectively, and mixing (a) the first pulse signal of the plurality of pulse signals, (b) the second pulse signal of the plurality of pulse signals, (c) the third pulse signal of the plurality of pulse signals, (d) the fourth pulse signal of the plurality of pulse signals, (e) the fifth pulse signal of the plurality of pulse signals, and (f) the sixth pulse signal of the plurality of pulse signals, with (i) the second signal of the first differential signal pair, (ii) the first signal of the third differential signal pair, (iii) the second signal of the second differential signal pair, (iv) the first signal of the first differential signal pair, (v) the second signal of the third differential signal pair, and (vi) the first signal of the second differential signal pair, respectively.

17. The method of claim 16, wherein the same duty ratio equals 26.67%.

18. The method of claim 16, wherein the same duty ratio is about 26.67%.

19. The method of claim 12, further comprising: adjusting the same duty ratio by adjusting a threshold voltage.

20. The method of claim 12, further comprising: generating the plurality of pulse signals using a frequency synthesizer circuit.

* * * * *